US007979365B2

(12) United States Patent
Goldberg et al.

(10) Patent No.: US 7,979,365 B2
(45) Date of Patent: Jul. 12, 2011

(54) METHODS AND SYSTEMS FOR INTERACTIVE COMPUTING

(75) Inventors: David E. Goldberg, Champaign, IL (US); Kumara Sastry, Champaign, IL (US); Xavier F. Llorá, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 326 days.

(21) Appl. No.: 11/700,989

(22) Filed: Jan. 31, 2007

(65) Prior Publication Data
US 2008/0183648 A1 Jul. 31, 2008

Related U.S. Application Data

(60) Provisional application No. 60/763,788, filed on Jan. 31, 2006.

(51) Int. Cl.
*G06F 15/18* (2006.01)
(52) U.S. Cl. ......................................................... 706/13
(58) Field of Classification Search .................... 706/13, 706/14
See application file for complete search history.

(56) References Cited

U.S. PATENT DOCUMENTS

| | | | | |
|---|---|---|---|---|
| 6,006,213 | A * | 12/1999 | Yoshida | 706/14 |
| 6,336,109 | B2 * | 1/2002 | Howard | 706/25 |
| 6,879,860 | B2 * | 4/2005 | Wakefield et al. | 607/57 |
| 6,892,191 | B1 * | 5/2005 | Schaffer | 706/14 |
| 6,892,192 | B1 * | 5/2005 | Geddes et al. | 706/14 |
| 7,043,462 | B2 | 5/2006 | Jin et al. | |
| 7,043,463 | B2 * | 5/2006 | Bonabeau et al. | 706/13 |
| 7,047,169 | B2 * | 5/2006 | Pelikan et al. | 703/2 |
| 7,136,710 | B1 * | 11/2006 | Hoffberg et al. | 700/83 |
| 7,243,056 | B2 | 7/2007 | Olhofer et al. | |
| 7,280,986 | B2 * | 10/2007 | Goldberg et al. | 706/13 |
| 7,324,979 | B2 | 1/2008 | Butler et al. | |
| 7,328,194 | B2 | 2/2008 | Dimitriou et al. | |
| 7,328,195 | B2 * | 2/2008 | Willis | 706/14 |
| 7,356,518 | B2 * | 4/2008 | Bonabeau et al. | 706/13 |
| 7,363,280 | B2 | 4/2008 | Jin et al. | |
| 7,363,281 | B2 * | 4/2008 | Jin et al. | 706/13 |
| 7,428,514 | B2 | 9/2008 | Jin et al. | |
| 7,444,309 | B2 | 10/2008 | Branke et al. | |
| 7,451,121 | B2 | 11/2008 | Wu et al. | |
| 7,457,786 | B2 | 11/2008 | Aragones et al. | |
| 2003/0055614 | A1 * | 3/2003 | Pelikan et al. | 703/2 |
| 2003/0220716 | A1 | 11/2003 | Mydlowec et al. | |

(Continued)

OTHER PUBLICATIONS

Levin and Nalebuff. An Introduction to Vote-Counting Schemes. Journal of Economic Perspectives, vol. 9 No. 1. Jan. 1995.*

(Continued)

*Primary Examiner* — Michael B Holmes
*Assistant Examiner* — David H Kim
(74) *Attorney, Agent, or Firm* — Greer, Burns & Crain Ltd.

(57) ABSTRACT

Methods and systems for creating a synthetic surrogate fitness function. User decisions are received representing fitness for a plurality of solutions. A partial ordering of the plurality of solutions is provided based on the received user decisions, wherein at least some of the plurality of solutions are represented to have a greater relative fitness than other of the plurality of solutions. A complete order of at least the plurality of solutions is induced based on the normalized partial ordering. A synthetic surrogate fitness function is generated using the induced complete order.

33 Claims, 21 Drawing Sheets

U.S. PATENT DOCUMENTS

| | | | |
|---|---|---|---|
| 2004/0181266 A1* | 9/2004 | Wakefield et al. | 607/57 |
| 2004/0220839 A1* | 11/2004 | Bonissone et al. | 705/4 |
| 2004/0254901 A1* | 12/2004 | Bonabeau et al. | 706/13 |
| 2005/0118557 A1* | 6/2005 | Sumner et al. | 434/118 |
| 2005/0119983 A1* | 6/2005 | Bonabeau et al. | 706/46 |
| 2005/0177351 A1 | 8/2005 | Goldberg et al. | |
| 2005/0209982 A1 | 9/2005 | Jin et al. | |
| 2005/0216879 A1* | 9/2005 | Ruhe | 717/101 |
| 2005/0256684 A1 | 11/2005 | Jin et al. | |
| 2005/0276479 A1 | 12/2005 | Goldberg et al. | |
| 2006/0184916 A1* | 8/2006 | Baum | 717/120 |
| 2006/0212279 A1 | 9/2006 | Goldberg et al. | |
| 2006/0225003 A1* | 10/2006 | Agogino et al. | 716/1 |
| 2007/0112698 A1 | 5/2007 | McArdle | |
| 2007/0208677 A1 | 9/2007 | Goldberg et al. | |
| 2007/0208996 A1* | 9/2007 | Berkner et al. | 715/521 |
| 2009/0070280 A1 | 3/2009 | Beygelzimer et al. | |

OTHER PUBLICATIONS

Ali et al. On the Minimum Violations Ranking of a Tournament. Management Science. Jun. 1986.*

Henriet. The Copeland Choice Function: An axiomatic Characterization. Social Choice and Welfare. May 1985.*

Miller. Graph-Theoretical Approcaches to the Theory of Voting. American Journal of Political Science. Nov. 1977.*

Moulin. Choosing from a Tournament. Social Choice and Welfare. Dec. 1986.*

Kosorukoff. Human Based Genetic Algorithm. Systems, Man, and Cybernetics, 2001 IEEE International Conference on. vol. 5, pp. 3464-3469. Oct. 2001.*

Lorena et al. An Hybrid GA/SVM Approach for Multiclass Classification with Directed Acyclic Graphs. Advances in Artificial Intelligence—SBIA 2004. Nov. 2004.*

Masui. Graphic Object Layout with Interactive Genetic Algorithms. Visual Languages, 1992. Proceedings., 1992 IEEE Workshop on. Sep. 1992.*

Harik et al. The Compact Genetic Algorithm. Evolutionary Computation IEEE Transactions on. vol. 3 No. 4. Nov. 1999.*

Takagi. Interactive Evolutionary Computation: Fusion of the Capabilities of EC Optimization and Human Evaluation. Proceedings of the IEEE. vol. 89n No. 9. Sep. 2001.*

Xavier Llora, Kumara Sastry, David E. Goldberg, Abhimanyu Gupta, Lalitha Lakshmi, Combatting User Fatigue in iGAs: Partial Ordering, Support Vector Machines, and Synthetic Fitness. Genetic and Evolutionary Computation Conference (GECCO) 2005, Jun. 25-29, 2005, Washington, DC.*

Xavier Llora, Kumara Sastry, David E. Goldberg, Abhimanyu Gupta, Lalitha Lakshmi. Combatting User Fatigue in iGAs: Partial Ordering, Support Vector Machines, and Synthetic Fitness. IlliGAL Technical Report No. 2005009, Feb. 2005.*

Xavier Llora, Francesc Alias, Lluis Formiga, Kumara Sastry, David E. Goldberg. Evaluation Consistency in iGAs: User Contradictions as Cycles in Partial-Ordering Graphs. IlliGAL Technical Report No. 2005022, Nov. 2005.*

Albert & Goldberg, "Efficient Evaluation Relaxation Under Integrated Fitness Functions." Intelligent Engineering Systems Through Artificial Neural Networks, 11, pp. 165-170, 2001. (Also IlliGAL Report No. 2001024).

Albert & Goldberg, "Efficient Discretization Scheduling in Multiple Dimensions." Proceedings of the Genetic and Evolutionary Computation Conference, pp. 271-278, 2002. (Also IlliGAL Report No. 2002006).

Alias & Llora, "Evolutionary Weight Tuning Based on Diphone Pairs for Unit Selection Speech Synthesis." in EuroSpeech, 2, pp. 1333-1336, Geneve, Switzerland (2003).

Alias, Llora, Idiondo, Sevillano, Formiga & Socoro, "Perception-Guided and Phonetic Clustering Weight Tuning Based on Diphone Pairs for Unit Selection TTS." In Proceedings of the $8^{th}$ International Conference on Spoken Language Processing (ICSLP), pp. 1333-1336. Jeju Island, Korea, 2004.

Armstrong & Jacobson, "Data Independent Neighborhood Functions and Strict Local Optima." Discrete Applied Mathematics, 146(3), pp. 233-243, 2005.

Back, T., "Selective Pressure in Evolutionary Algorithms: A Characterization of Selection Mechanisms." Proceedings of the First IEEE Conference on Evolutionary Computation, pp. 57-62, 1994.

Baluja, S. (1994). "Population-based incremental learning: A method of integrating genetic search based function optimization and competitive learning." (Technical Report CMU-CS-94-163). Carnegie Mellon University.

Barbulescu, Watson, Whitley, Howe, "Scheduling Space-Ground Communications for the Air Force Satellite Control Network." Journal of Scheduling, 7(1), pp. 7-34, 2004.

Barnes, Dimova, Dokov, "The Theory of Elementary Landscapes." Applied Mathematical Letters, 16, pp. 337-343, 2003.

Bartelemy & Haftka, "Approximation Concepts for Optimum Structural Design—A Review." Structural Optimization, 5, pp. 129-144, 1993.

Bergener, Bruckhoff & Igel, "Evolutionary Parameter Optimization for Visual Obstacle Detection." Proc. Advanced Concepts for Intelligent Vision Systems, (ACIVS99), pp. 104-109, 1999.

Bertsekas, D., "Incremental Least Squares Methods and the Extended Kalman Filter." SIAM Journal on Optimization, 6(3), pp. 807-822, 1996).

Beyer, H., "Toward a Theory of Evolution Strategies: Self-adaptation." Evolutionary Computation, 3(3), pp. 311-347, 1996.

Biles, J., "Genjam: A Genetic Algorithm for Generating Jazz Solos." Proc. Int. Computer Music Conf., pp. 131-137, 1994.

Black, A., "Perfect Synthesis for All of the People All of the Time." In IEEE TTS Workshop 2002 (keynote). Santa Monica, USA, 2002 (4 pages).

Black & Tokuda, "Blizzard Challenge—2005: Evaluating Corpus-based Speech Synthesis on Common Datasets." In Proceedings of the $9^{th}$ International Conference on Speech Communication and Technology (InterSpeech), pp. 77-80. Lisboa, Portugal, 2005.

Booker, Dennis, Frank, Serafini, Torczon & Trosset, "A Rigorous Framework for Optimization of Expensive Functions by Surrogates." (Technical Report). Hampton, VA: National Aeronautics and Space Administration (NASA). ICASE Report No. 98-47, 1998.

Bull, "On Model-Based Evolutionary Computation." Soft Comp., 3, pp. 76-82, 1999.

Burke & Smith, "A Multi-Stage Approach for the Thermal Generator Maintenance Scheduling Problem." Proc. 1999 Congress Evolutionary Computation, 2, pp. 1085-1092, Piscataway, NJ: IEEE Jul. 1999.

Cantu-Paz & Goldberg, "On the Scalability of Parallel Genetic Algorithms." Evolutionary Computation, 7(4), pp. 429-449, 1999.

Cantu-Paz, "A Summary of Research on Parallel Genetic Algorithms," Tech. Rep. 95007, IlliGAL Rep., 1995.

Carpenter & Barthelemy, "A Comparison of Polynomial Approximations and Artificial Neural Nets as Response Surfaces." Struc. Optimiz., 5, pp. 1166-1174, 1993.

Chen, Goldberg, Ho, Sastry, "Fitness Inheritance in Multiobjective Optimization." Proceedings of the Genetic and Evolutionary Computation Conference, pp. 319-326, 2002. (Also IlliGAL Report No. 2002017).

Chen & Goldberg, "Introducing Start Expression Genes to the Linkage Learning Genetic Algorithm." In Parallel Problem Solving from Nature (PPSN VII), pp. 351-360, 2002, Springer. (IlliGAL Report No. 2002007).

Coello-Coello, C., "An Updated Survey of GA-Based Multi-objective Optimization Techniques." (Technical Report Lania-RD-09-08). Laboratorio Nacional de Informatica Avanzada (LANIA), Xalapa, Veracruz, Mexico, Dec. 1998.

Coello-Coello, C., "An Updated Survey of Evolutionary Multiobjective Optimization Techniques: State of the Art and Future Trends." Proc. 1999 Congress on Evolutionary Computation, pp. 3-13, Piscataway, NJ: IEEE, 1999.

Colletti & Barnes, "Using Group Theory to Construct and Characterize Metaheuristic Search Neighborhoods." In Rego & Alidaee (eds.), Adaptive Memory and Evolution: Tabu Search and Scatter Search, pp. 303-329, Boston, MA: Kluwer Academic Publishers (2004).

Coletti, Barnes, Dokov, "A Note on Characterizing the k-OPT Neighborhood Via Group Theory." Journal of Heuristics, 5, pp. 47-51, 1999.

Cooper & Herskovits, "A Bayesian Method for the Induction of Probabilistic Networks from Data." Machine Learning, 9, pp. 309-347, 1992.

Coorman, Fackrell, Rutten & Van Coile, "Segment Selection in the L&H RealSpeak Laboratory TTS System." In ICSLP, 2, pp. 395-398, Beijing, China, 2000.

Deb, Agrawal, Pratab & Meyarivan, "A Fast Elitist Non-Dominated Sorting Genetic Algorithm for Multi-Objective Optimization: NSGA-II" (KanGAL report 200001). Indian Institute of Technology, 2000.

Dennis & Torczon, "Managing Approximation Models in Optimization." In Alexandrov & Hussaini, (Eds.), Multidisciplinary Design Optimization: State-of-the-Art, pp. 330-347, Philadelphia, PA: SIAM (1997).

Dunham, Fridshal, D., Fridshal, R. & North, "Design by Natural Selection." Synthese, 15, pp. 254-259, 1963.

El-Beltagy, Nair & Keane, "Metamodeling Techniques for Evolutionary Optimization of Expensive Problems: Promises and Limitations." Proc. Genetic and Evolutionary Computation Conf., pp. 196-203, 1999.

Etxeberria & Larranaga, "Global Optimization Using Bayesian Networks." In Rodriguez, et al, (Eds.), Second Symposium on Artificial Intelligence (CIMAF-99), pp. 332-339, Havana, Cuba, 1999.

Goldberg, D., "The Race, the Hurdle, and the Sweet Spot." In Bentley, (Ed.), Evolutionary Design by Computers, pp. 105-118. San Francisco, CA: Morgan Kaufmann, 1999.

Goldberg, D.E., et al., "Discovering deep building blocks for component genetic algorithms using chance discovery via KeyGraphs." In Oshawa, Y., McBurney, P. (Eds.), *Chance Discovery* (pp. 276-302). Berlin: Springer-Verlag.

Goldberg, D.E. et al., "DISCUS: Distributed innovation and scalable collaboration in uncertain settings." (IlliGAL Report No. 2003017). Urbana, IL: University of Illinois at Urbana-Champaign, Illinois Genetic Algorithms Laboratory.

Goldberg & Voessner, "Optimizing Global-local Search Hybrids." Proceedings of the Genetic and Evolutionary Computation Conference, pp. 220-228, 1999. (Also IlliGAL Report No. 99001).

Goldberg, D., "Using Time Efficiently: Genetic-evolutionary Algorithms and the Continuation Problem." Proceedings of the Genetic and Evolutionary Computation Conference, pp. 212-219, 1999. (Also IlliGAL Report No. 99002).

Goldberg, D., "Making Genetic Algorithms Fly: A Lesson from the Wright Brothers." Advanced Technology for Developers, 2, pp. 1-8 (1993).

Goldberg, Deb, Kargupta & Harik, "Rapid, Accurate Optimization of Difficult Problems Using Fast Messy Genetic Algorithms." Proceedings of the Fifth International Conference on Genetic Algorithms, pp. 56-64, 1993.

Goldberg, Korb & Deb, "Messy Genetic Algorithms: Motivation, Analysis, and First Results." Complex Systems, 3(5), pp. 493-530, 1989 (Also TCGA Report No. 89001).

Grierson & Pak, "Optimal Sizing, Geometrical and Topological Design Using a Genetic Algorithm." Struc. Optimiz., 6(3), pp. 151-159, 1993.

Handa, "The Effectiveness of Mutation Operation in the Case of Estimation of Distribution Algorithms." Biosystems 87, pp. 243-251, 2007.

Hansen & Ostermeier, "Completely Derandomized Self-adaptation in Evolution Strategies." Evolutionary Computation, 9(2), pp. 159-195, 2001.

Harik & Goldberg, "Learning Linkage." Foundations of Genetic Algorithms 4, 4, pp. 247-262, 1997. (Also IlliGAL Report No. 96006).

Harik, G., "Linkage Learning Via Probabilistic Modeling in the ECGA." (IlliGAL Report No. 99010), Urbana, IL: Illinois Genetic Algorithms Laboratory, University of Illinois at Urbana-Champaign, 1999.

Harik, Lobo & Goldberg, "The Compact Genetic Algorithm." IEEE Transactions on Evolutionary Computation, 3(4), pp. 287-297, 1999.

Harik, Cantu-Paz, Goldberg & Miller, "The Gambler's Ruin Problem, Genetic Algorithms, and the Sizing of Populations." Evolutionary Computation, 7(3), pp. 231-253, 1999. (Also IlliGAL Report No. 96004).

Harwig & Barnes, "An Adaptive Tabu Search Approach for 2-Dimensional Orthogonal Packing Problems." Military Operations Research (31 pages).

Heckendorn & Wright, "Efficient Linkage Discovery by Limited Probing." Evolutionary Computation, 12(4), pp. 517-545, 2004.

Heckerman, Geiger & Chickering, "Learning Bayesian Networks: The Combination of Knowledge and Statistical Data." (Technical Report MSR-TR-94-09). Redmond, WA: Microsoft Research, pp. 197-243, 1994.

Henriet, D., "The Copeland Choice Function An Axiomatic Characterization." *Social Choice and Welfare* (1985) 2 p. 49-63.

Hunt & Black, "Unit Selection in a Concatentative Speech Synthesis System Using a Large Speech Database." In ICASSP, 1, pp. 373-376, Atlanta, USA, 1996.

Jin, Y., "A Framework for Evolutionary Optimization with Approximate Fitness Functions." IEEE Transactions on Evolutionary Computation, 6(5), pp. 481-494, 2002.

Jin, Y., "A Comprehensive Survey of Fitness Approximation in Evolutionary Computation." Soft Computing Journal, 9(1), pp. 3-12, 2005.

Jin, Olhofer & Sendhoff, "Managing Approximate Models in Evolutionary Aerodynamic Design Optimization." Proceedings of the IEEE International Conference on Evolutionary Computation, pp. 523-528, 2000.

Kosorukoff, Alex, "Human Based Genetic Algorithm", Illinois Genetic Algorithims Laboratory p. 3464-3469.

Levin, Jonathan et al., "An Introduction to Vote-Counting Schemes", *The Journal of Economic Perspectives*, vol. 9, No. 1 (Winter, 1995) p. 3-26.

Lima, Sastry, Goldberg, Lobo, "Combining Competent Crossover and Mutation Operators: A Probabilistic Model Building Approach." Proceedings of the 2005 Genetic and Evolutionary Computation Conference, pp. 735-742, 2005. (Also IlliGAL Report No. 2005002).

Lima, Pelikan, Sastry, Butz, Goldberg, Lobo, "Substructural Neighborhoods for Local Search in the Bayesian Optimization Algorithm." Parallel Problem Solving from Nature (PPSN IX), pp. 232-241, 2006. Available: ftp://ftp-illigal.ge.uiuc.edu/pup/paperspIlliGALs/2006021.pdf.

Llora, Sastry, Goldberg, Gupta & Lakshmi, "Combating User Fatigue in iGAs: Partial Ordering, Support Vector Machines and Synthetic Fitness." Proceedings of Genetic and Evolutionary Computation Comference 2005 (GECCO-2005), pp. 1363-1371, 2005. (Also IlliGAL Report No. 2005009).

Llora, Alias, Formiga, Sastry & Goldberg, "Evaluation Consistency in iGAs: User Contradictions as Cycles in Partial-Ordering Graphs." University of Illinois at Urbana-Champaign, Urbana, IL: Illinois Genetic Algorithms Laboratory, 2005. (Also IlliGAL Report No. 2005022).

Llora, X., et al,, Enhanced innovation: A fusion of chance discovery and evolutionary computation to foster creative processes and decision making, (IliGAL Report No. 2004012), University of Illinois at Urbana-Champaign, Illinois Genetic Algorithms Laboratory, Urbana, IL.

Mackay, "Information-based Objective Functions for Active Data Selection." Neural Comput., 4(4), pp. 305-318, 1992.

Masui, T., "Graphic Object Layout with Interactive Genetic Algorithms." Proc IEEE Workshop Visual Languages, pp. 74-80, 1992.

Meron & Hirose, Efficient Weight Training for Selection Based Synthesis. In EuroSpeech, 5, pp. 2319-2322 (1999). Budapest, Hungary.

Merz, P., "Memetic Algorithms for Combinatorial Optimization Problems: Fitness Landscapes and Effective Search Strategies." Doctoral dissertation, University of Siegen, Germany, 2000 (Part 1 of 2—pp. 1-136).

Merz, P., "Memetic Algorithms for Combinatorial Optimization Problems: Fitness Landscapes and Effective Search Strategies." Doctoral dissertation, University of Siegen, Germany, 2000 (Part 2 of 2—pp. 137-207).

Miller, Nicholas R., "Graph-Theoretical Approaches to the Theory of Voting", American Journal of Political Science, vol. 21, No. 4, (Nov. 1977) p. 769-803.

Miller & Goldberg, "Genetic Algorithms, Tournament Selection, and the Effects of Noise." Complex Systems, 9(3), pp. 193-212, 1995. (Also IlliGAL Report No. 95006).

Miller, B., "Noise, Sampling, and Efficient Genetic Algorithms." Doctoral dissertation, University of Illinois at Urbana-Champaign, General Engineering Department, Urbana, IL, May 1997. (Also IlliGAL Report No. 97001).

Moscato, P., "On Evolution, Search, Optimization, Genetic Algorithms and Martial Arts: Towards Memetic Algorithms." (Technical Report C3P 826). Pasadena, CA: Caltech Concurrent Computation Program, California Institute of Technology, 1989.

Moulin, H., "Choosing from a Tournament", Social Choice and Welfare (1986) 3 p. 271-291.

Muhlenbein & Schlierkamp-Voosen, "Predictive Models for the Breeder Genetic Algorithm: I. Continuous Parameter Optimization." Evolutionary Computation, 1(1), pp. 25-49, 1993.

Munetomo & Goldberg, "Linkage Identification by Non-Monotonicity Detection for Overlapping Functions." Evolutionary Computation, 7(4), pp. 377-398, 1999.

Ohsawa, Y., et al., "KeyGraph Automatic indexing by co-occurrence graph based on building construction metaphor", Proceedings of Advances in Digital Libraries, 12-18 (1998).

Ohsawa, Y., et al., "Chance Discovery", Berlin: Springer-Verlag (2003).

Ostermeier, "A Derandomized Approach to Self Adaptation of Evolutionary Strategies." Evolut. Comput., 2(4), pp. 369-380, 1994.

Pelikan, M., "Bayesian Optimization Algorithm: From Single Level to Hierarchy." Doctoral dissertation, University of Illinois at Urbana-Champaign, Urbana, IL, 2002. (Also IlliGAL Report No. 2002023).

Pelikan & Sastry, "Fitness inheritance in the Bayesian Optimization Algorithm." Proceedings of the Genetic and Evolutionary Computation Conference, 2, pp. 48-59, 2004. (Also IlliGAL Report No. 2004009).

Pelikan & Goldberg, "Escaping Hierarchical Traps with Competent Genetic Algorithms." Proceedings of the Genetic and Evolutionary Computation Conference, pp. 511-518, 2001. (Also IlliGAL Report No. 2000020).

Pelikan, M., "Hierarchical Bayesian Optimization Algorithm: Toward a New Generation of Evolutionary Algorithms." Springer, pp. 2738-2743 (2005).

Pelikan, Goldberg & Cantu-Paz, "BOA: The Bayesian Optimization Algorithm." In Banzhaf et al, (Eds.), Proceedings of the Genetic and Evolutionary Computation Conference GECCO-99, pp. 525-532, San Francisco, CA: Morgan Kaufmann (1999). (Also IlliGAL Report No. 99003).

Pelikan, Goldberg, Cantu-Paz, "Bayesian Optimization Algorithm, Population Sizing, and Time to Convergence." In Whitley, Goldberg, Cantu-Paz, Spector, Parmee & Beyer, (Eds.), Proceedings of the Genetic and Evolutionary Computation Conference (GECCO-2000), pp. 275-282, Las Vegas, NV: Morgan Kaufmann (Jul. 10-12, 2000). (Also IlliGAL Report No. 2000001).

Pelikan, Goldberg & Lobo, "A Survey of Optimization by Building and Using Probabilistic Models." Computational Optimization and Applications, 21(1), pp. 5-20, 2002. (Also IlliGAL Report No. 99018).

Plutowski & White, "Selecting Concise Training Sets from Clean Data." IEEE Trans. Neural Networks, 4, pp. 305-318, 1993.

Ratle, "Accelerating the Convergence of Evolutionary Algorithms by Fitness Landscape Approximation." In Parallel Problem Solving from Nature, Eiben, Back, Schoenauer & Schwefel (Eds.), vol. V., pp. 87-96, Berlin, Germany: Springer (1998.

Redmond & Parker, "Actuator Placement Based on Reachable Set Optimization for Expected Disturbance." J. Optimiz. Theory Applic., 90(2), pp. 279-300, Aug. 1996.

Rosenbrock, "An Automatic Method for Finding the Greatest or Least Value of a Function." Comput. J., 3(3), pp. 175-184, 1960.

Sacks, Welch, Michell & Wynn, "Design and Analysis of Computer Experiments." Statist. Sci., 4, pp. 409-435, 1989.

Santarelli, Goldberg & Yu, "Optimization of a Constrained Feed Network for an Antenna Array Using Simple and Competent Genetic Algorithm Techniques." Military and Security Application of Evolutionary Computation (MSAEC-2004), Workshop Proceedings at the Genetic and Evolutionary Computation Conference, 2004 (3 pages).

Santarelli, Yu, Goldberg, Altschuler, O'Donnell & Southall (in press), "Military Antenna Design Using Simple and Competent Genetic Algorithms." Computer and Mathematics with Applications and Mathematical and Computer Modeling (72 pages).

Sastry, Goldberg & Pelikan, "Efficiency Enhancement of Probabilistic Model Building Genetic Algorithms." Urbana, IL: University of Illinois at Urbana-Champaign, Illinois Genetic Algorithms Laboratory, 2004. (Also IlliGAL Report No. 2004020).

Sastry, K., "Evaluation-Relaxation Schemes for Genetic and Evolutionary Algorithms." Master's thesis, University of Illinois at Urbana-Champaign, General Engineering Department, Urbana, IL, 2001. (Also IlliGAL Report No. 2002004).

Sastry & Goldberg, "Genetic Algorithms, Efficiency Enhancement, and Deciding Well with Fitness Functions with Differing Bias Values." Proceedings of the Genetic and Evolutionary Computation Conference (GECCO-2002), pp. 536-543, 2002. (Also IlliGAL Report No. 2002003).

Sastry, Abbass & Goldberg, "Sub-structural Niching in Non-Stationary Environments." Urbana, IL: Illinois Genetic Algorithms Laboratory, University of Illinois at Urbana-Champaign, 2004. (Also IlliGAL Report No. 2004035).

Sastry, Pelikan, & Goldberg, "Efficiency Enhancement of Genetic Algorithms Via Building-block-wise Fitness Estimation." Proceedings of the IEEE International Conference on Evolutionary Computation, pp. 720-727, 2004. (Also IlliGAL Report No. 2004010).

Sastry, Lima, & Goldberg, "Evaluation Relaxation Using Substructural Information and Linear Estimation." Proceedings of the 2006 Genetic and Evolutionary Computation Conference, pp. 419-426, 2006. (Also IlliGAL Report No. 2006003).

Sastry & Goldberg, "Let's Get Ready to Rumble: Crossover Versus Mutation Head to Head." Proceedings of the Genetic and Evolutionary Computation Conference, 2, pp. 126-137, 2004. (Also IlliGAL Report No. 2004005).

Sastry & Goldberg, "Designing Competent Mutation Operators Via Probabilistic Model Building of Neighborhoods." Proceedings of the Genetic and Evolutionary Computation Conference, 2, pp. 114-125. (Also IlliGAL Report No. 2004006).

Sastry & Goldberg, "Genetic Algorithms, Efficiency Enhancement, and Deciding Well with Differing Fitness Bias Values." Proceedings of the Genetic and Evolutionary Computation Conference, pp. 536-543, 2002a. (Also IlliGAL Report No. 2002003).

Sastry & Goldberg, "Genetic Algorithms, Efficiency Enhancement, and Deciding Well with Differing Fitness Variances." Proceedings of the Genetic and Evolutionary Computation Conference, pp. 528-535, 2002b. (Also IlliGAL Report No. 2002002).

Sastry & Goldberg, "Don't Evaluate, Inherit." Proceedings of the Genetic and Evolutionary Computation Conference. pp. 551-558, 2001. (Also IlliGAL Report No. 2001013).

Sastry, Johnson, Goldberg & Bellon, "Genetic Programming for Multiscale Modeling." International Journal of MultiScale Computational Engineering, 2(2), pp. 239-256, 2004.

Schwarz, G., "Estimating the Dimension of a Model." The Annals of Statistics, 6, pp. 461-464, 1978.

Sebag & Ducoulombier, "Extending Population-Based Incremental Learning to Continuous Search Spaces." Lecture Notes in Computer Science, 1498, pp. 418-427, 1998.

Simpson, Mauery, Korte & Mistree, "Comparison of Response Surface and Kriging Models for Multidisciplinary Design Optimization." AIAA, Tech. Rep., 1998 (11 pages).

Sims, "Artificial Evolution for Computer Graphics." Comput. Graph., 25(4), pp. 319-328, 1991.

Smith, Dike & Stegmann, "Fitness Inheritance in Genetic Algorithms." In Proceedings of the ACM Symposium on Applied Computing, pp. 345-350, 1995. New York, NY, USA: ACM.

Spears, W., "Crossover or Mutation?" In Whitley, (ed.), Foundations of Genetic Algorithms 2, pp. 221-237. San Mateo, CA: Morgan Kaufmann (1993).

Srivastava, R., "Time Continuation in Genetic Algorithms." Masters thesis, University of Illinois at Urbana-Champaign, Urbana, IL, 2002. (Also IlliGAL Report No. 2002021) Available: ftp://ftp-illigal.ge.uiuc.edu/pub/papers/IlliGALs/2002021.ps.Z.

Stoica, Klimeck, Salazar-Lazaro, Keymeulen & Thakoor, "Evolutionary Design of Electronic Devices and Circuits." Proc. 199 Congress on Evolutionary Computation, pp. 1271-1278, Piscataway, NJ: IEEE, Jul. 1999.

Takagi, H., "Interactive Evolutionary Computation: Fusion of the Capabilities of EC Optimization and Human Evaluation." Proceedings of the IEEE, 89(9), pp. 1275-1296, 2001.

Thierens, D., "Scalability Problems of Simple Genetic Algorithms." Evolutionary Computation, 7(4), 331-352, 1999.

Toda, Kawai & Tsuzaki, "Optimizing Sub-Cost Functions for Segment Selection Based on Perceptual Evaluations in Concatentative Speech Synthesis." In Proceedings of ICASSP, pp. 657-660. Montreal, Canada, 2004.

Vaughan, Jacobson, Armstrong, "A New Neighborhood Function for Discrete Manufacturing Process Design Optimization Using Generalized Hill Climbing Algorithms." ASME Journal of Mechanical Design, 122(2), pp. 164-171, 2000.

Vijayakumar & Ogawa, "Improving Generalization Ability Through Active Learning." IECE Trans. Inform. Syst., E82-D(2), pp. 480-487, 1999.

Watson, J., "Empirical Modeling and Analysis of Local Search Algorithms for the Job-shop Scheduling Problem." Doctoral dissertation, Colorado State University, Fort Collins, CO, 2003 (Part 1 of 2—pp. 1-130).

Watson, J., "Empirical Modeling and Analysis of Local Search Algorithms for the Job-shop Scheduling Problem." Doctoral dissertation, Colorado State University, Fort Collins, CO, 2003 (Part 2 of 2—pp. 131-217).

* cited by examiner

| $v$ | $f(v)$ | $r(v)$ | $\delta(v)$ | $\hat{\phi}(v)$ | $\hat{f}(v)$ | $\hat{r}(v)$ |
|---|---|---|---|---|---|---|
| 010111 | 4 | 1 | 5 | 0 | 5 | 1 |
| 010100 | 2 | 3 | 0 | 1 | -1 | 4 |
| 010101 | 3 | 2 | 1 | 1 | 0 | 3 |
| 100001 | 2 | 3 | 0 | 2 | -2 | 5 |
| 100000 | 1 | 4 | 0 | 3 | -3 | 6 |
| 101010 | 3 | 2 | 2 | 0 | 2 | 2 |
| 001000 | 1 | 4 | 0 | 3 | -3 | 6 |
| 001110 | 3 | 2 | 2 | 0 | 2 | 2 |

FIG. 8

1: Create an empty directed graph $\mathcal{G} = <\mathcal{V}, \mathcal{E}>$.
2: Create $2^h$ random initial solutions ($\mathcal{V}$ set).
3: Create the hierarchical tournament set $\mathcal{T}$ using the available solutions in $\mathcal{V}$.
4: Present the tournaments in $\mathcal{T}$ to the user and update the partial ordering in $\mathcal{E}$.
5: Estimate $\hat{r}(v)$ for each $v \in \mathcal{V}$.
6: Train the surrogate $\varepsilon$-SVM surrogate synthetic fitness based on $\mathcal{G}$ and $\hat{r}(v)$.
7: Optimize the $\varepsilon$-SVM synthetic fitness using the cGA.
8: Create a $\mathcal{S}'$ set with $2^{h-1}$ new different solutions, where $\mathcal{V} \cap \mathcal{V}' = \emptyset$, sampling out of the probabilistic model evolved by cGA.
9: Create hierarchical tournament set $\mathcal{T}'$ with $2^h - 1$ tournaments using $2^{h-1}$ solutions in $\mathcal{S}$ and $2^{h-1}$ solutions in $\mathcal{V}$.
10: $\mathcal{V} \leftarrow \mathcal{V} \cup \mathcal{V}'$
11: $\mathcal{T} \leftarrow \mathcal{T} \cup \mathcal{T}'$
12: Go to 4 while not converged.

FIG. 9

| $v$ | $f(v)$ | $r(v)$ | $\delta(v)$ | $\phi(v)$ | $\hat{f}(v)$ | $\hat{r}(v)$ |
|---|---|---|---|---|---|---|
| 010111 | 4 | 1 | 5 | 0 | 5 | 1 |
| 010100 | 2 | 3 | 0 | 1 | -1 | 5 |
| 010101 | 3 | 2 | 1 | 1 | 0 | 4 |
| 100001 | 2 | 3 | 0 | 2 | -2 | 6 |
| 100000 | 1 | 4 | 0 | 3 | -3 | 7.5 |
| 101010 | 3 | 2 | 2 | 0 | 2 | 2.5 |
| 001000 | 1 | 4 | 0 | 3 | -3 | 7.5 |
| 001110 | 3 | 2 | 2 | 0 | 2 | 2.5 |

FIG. 12

| Consistency percentage in simple interactive genetic algorithm runs ||||
| Phrase | Novice User (%) | Knowledgeable User (%) | Expert User (%) |
| --- | --- | --- | --- |
| "De la seva selva" | 94.44 | 85.51 | 78.43 |
| "Fusta de Birmània" | 85.71 | 76.92 | 91.07 |
| "I els han venut" | 89.36 | 86.96 | 73.08 |
| "Grans extensions" | 94.23 | 80.00 | 100.00 |

| Consistency in active interactive genetic algorithm runs ||||
| Phrase | Novice User (%) | Knowledgeable User (%) | Expert User (%) |
| --- | --- | --- | --- |
| "De la seva selva" | 100.00 | 89.19 | 100.00 |
| "Fusta de Birmània" | 100.00 | 100.00 | 100.00 |
| "I els han venut" | 100.00 | 100.00 | 94.83 |
| "Grans extensions" | 100.00 | 100.00 | 100.00 |

FIG. 17

| Phrase | Novice User (%) | Knowledgeable User (%) | Expert User (%) | Summary |
|---|---|---|---|---|
| "De la seva selva" | 5.89 | 4.30 | 27.50 | 12.56 |
| "Pasta de Birmània" | 16.67 | 30.01 | 9.81 | 18.83 |
| "I els han venut" | 11.91 | 15.00 | 29.76 | 18.89 |
| "Grans extensions" | 6.12 | 25.00 | 0.00 | 10.37 |
| Summary | 10.148 | 18.58 | 16.77 | 15.16 |

FIG. 22

| Phrase | Novice User | Knowledgeable User | Expert User | Summary |
|---|---|---|---|---|
| "De la seva selva" | 2.00 | 2.00 | 2.00 | 2.00 |
| "Festa de Bermània" | 2.00 | 2.00 | 2.00 | 2.00 |
| "I els han vençut" | 2.00 | 2.00 | 2.00 | 2.00 |
| "Grans extensions" | 2.00 | 2.67 | 2.00 | 2.23 |
| Summary | 2.00 | 2.17 | 2.00 | 2.06 |

FIG. 23

METHODS AND SYSTEMS FOR INTERACTIVE COMPUTING

PRIORITY CLAIM

This application claims the benefit of U.S. Provisional Application Ser. No. 60/763,788, filed Jan. 31, 2006, under 35 U.S.C. §119.

STATEMENT OF GOVERNMENT INTEREST

This invention was made with Government support under Contract Number F49620-03-1-0129 awarded by the Air Force Office of Scientific Research (AFOSR) and Contract Numbers N00014-01-1-0175 and N00014-01-1-0562 awarded by the Office of Naval Research (ONR). The Government has certain rights in the invention.

BACKGROUND OF THE INVENTION

The invention relates generally to the field of methods and systems for interactive computing. The invention relates more particularly to the fields of methods for optimization.

Genetic and evolutionary algorithms (GAs) may be employed to optimize a solution set in a variety of problem types. Generally, GAs include selection from among a plurality of possible solutions based on fitness and recombination of one or more selected solutions to generate additional possible solutions. These two actions may be repeated as necessary until there is a convergence to an optimal or suitable solution.

An important concept used in GAs to implement a survival-of-the-fittest mechanism and to distinguish between good and bad solutions is the notion of fitness. Unlike traditional search methods, a fitness measure can be relative, and it can be an objective measure including a mathematical equation, model, or a computation. It could also be a subjective measure involving human evaluation, or even be coevolved in a co-operative or competitive environment.

GAs may be classified generally based on whether selection (choosing) and recombination (innovation), respectively, are performed by a human or by a computational agent such as, but not limited to, a computer. For example, a standard GA relies on computational selection (e.g., via computing a fitness function, model, or computation) and recombination (e.g., crossover and/or mutation). Computer-aided design (CAD), on the other hand, relies on computational selection of solutions, but a human performs the recombination of the solutions. In a human-based GA, a human performs both steps, though these steps may be augmented, for example, by a network or other communication or collaborative medium.

GAs in which fitness measure or quality of candidate solutions (e.g., selection or choosing) is provided by human evaluation and/or judgment rather than a fitness function, but in which recombination (e.g., innovation) is at least in part based on a computational agent are referred to as interactive genetic algorithms (iGAs). iGAs, a method of interactive evolutionary computation, allow human interaction to provide subjective input regarding fitness, while still providing computational recombination.

More particularly, in conventional iGAs, qualitative fitness as determined by a human user replaces quantitative fitness. As one example of providing qualitative fitness, a subset of generated solutions may be sorted and presented to a user, who selects a preferred solution from among the presented ones. The preferred solution is used for computationally-provided recombination of new subsets, which are again presented to the user.

Dawkin's Blind Watchmaker program, described in Dawkins, R., The Blind Watchmaker, New York: W. W. Norton, 1986, and the Faceprints system developed at New Mexico State University, as described in Caldwell, C., and Johnston, V. S., "Tracking a criminal suspect through face-space with a genetic algorithm", Proceedings of the Fourth International Conference on Genetic Algorithms, Morton Kaufmann, 1991, pp, 416-421, are two nonlimiting examples of iGAs. For example, in Faceprints, a system replaces the role of a human sketch artist in evolving the faces of criminal suspects from witness recollection. Faces are encoded as binary strings, where subcodes represent different facial features (nose type, mouth type, hair type, etc.). Each full chromosome maps to a face, and the population of chromosomes is presented to the human critic, who is asked to determine how closely the face resembles that of the criminal. This subjective ten-point scale is used to drive the evolution of subsequent generations of faces, and in a relatively short time, the iGA arrives at a reasonable facsimile of the correct face.

However, unlike in evolutionary algorithms with objective fitness measures, one of the daunting challenges of iGAs is providing effective methods of combating user fatigue. Because a human is in charge of the evaluation of a solution, user fatigue results from the large time scale between user evaluations and the evolutionary mechanisms used to generate new solutions until convergence. For example, even for moderately sized problems, iGAs may require, for example, a few hundred to a few thousand fitness evaluations, which is highly improbable—sometimes even impossible—for users to perform. User fatigue may occur at fairly short time periods, such as within 1-2 hours, or even earlier.

User fatigue can result in sub-optimal solutions, or the end of an iGA session before even a suitable solution is found. Similarly, repeated evaluation of similar solutions can result in user frustration relatively quickly, compounding user fatigue.

Additionally, an important element for the successful application of interactive genetic algorithms (iGAs) or any other interactive evolutionary computation method is the reliability of the evaluations, or decisions, provided by a user. The decisions that the user makes when using an iGA guide the search across the space of possible hypotheses. Any interactive procedure, regardless of how efficient it can be for reducing the number of evaluations required, will fail to provide high-quality solutions if the user is unable to provide consistent fitness evaluations.

Thus, it is desired to provide ways to improve efficiency enhancement for iGAs, while also providing the reliability needed to use iGAs successfully.

SUMMARY OF THE INVENTION

Methods and systems for creating a synthetic surrogate fitness function are provided according to embodiments of the present invention. In exemplary methods and systems, user decisions are received representing fitness for a plurality of solutions. A partial ordering of the plurality of solutions is provided based on the received user decisions, wherein at least some of the plurality of solutions are represented to have a greater relative fitness than other of the plurality of solutions. A complete order of at least the plurality of solutions is induced based on the normalized partial ordering. A synthetic surrogate fitness function is generated using the induced complete order.

BRIEF DESCRIPTION OF THE DRAWINGS

FIG. 8 shows estimation of fitness and global ranking based on dominance measures, according to embodiments of the present invention;

FIG. 9 shows steps in an exemplary active iGA process, according to embodiments of the present invention;

FIG. 12 shows an estimation of global ranking based on dominance measures, according to embodiments of the present invention;

FIG. 17 shows consistency percentages for simple iGA runs;

FIG. 22 shows consistency enhancement percentages achieved by replacing a simple iGA with an active iGA according to embodiments of the present invention; and FIG. 23 shows efficiency enhancement achieved by replacing a simple iGA with an active iGA according to embodiments of the present invention.

DETAILED DESCRIPTION

Figure 2:
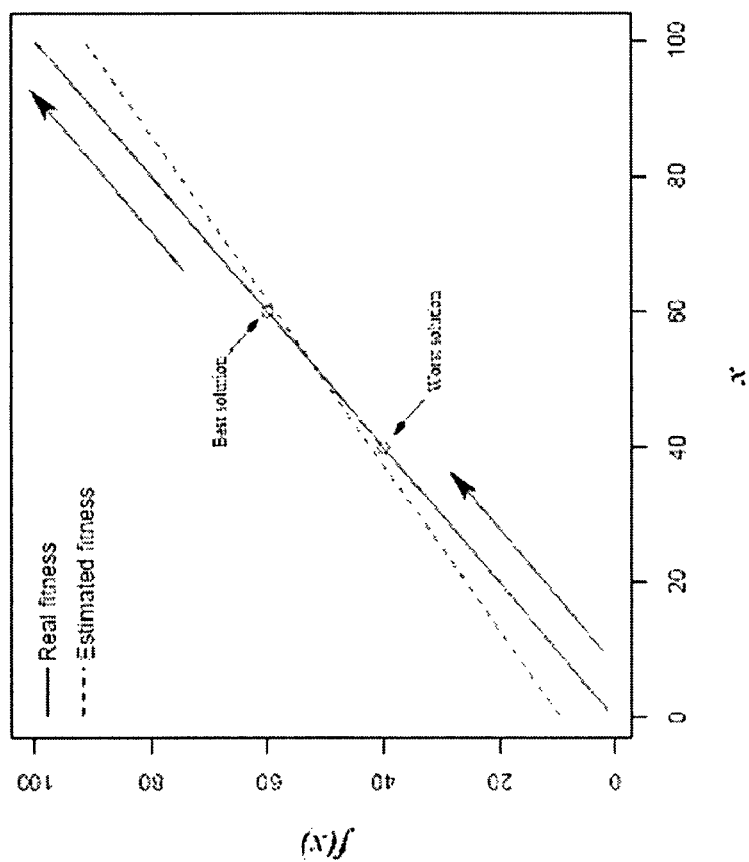
FIG. 2 shows real and estimated fitness for a OneMax function in which fitness extrapolation is provided by a regression surrogate model heuristic.

Simple GAs may require hundreds or thousands of fitness evaluations before finding good quality solutions, but most human evaluators providing feedback to an iGA will tire far short of best convergence. User fatigue and reliability concerns with iGAs place a premium on efficiency enhancement techniques. Efficiency enhancement techniques, for example, may reduce the number of evaluations needed, avoid repetitive evaluations, and/or provide a "eureka" moment on the part of the user, thus more quickly achieving an optimal or suitable solution. For example, techniques such as parallelization, time continuation, evaluation relaxation, and hybridization are useful approaches to combat evaluation fatigue by reducing the convergence time.

Generally, in evaluation relaxation schemes, a computationally costly, but accurate function evaluation is replaced by a cheap, but less accurate surrogate function. Examples of evaluation relaxation for GAs are described in Sastry, K., "Evaluation-relaxation schemes for genetic and evolutionary algorithms", Master's thesis, University of Illinois at Urbana-Champaign, General Engineering Department, Urbana, Ill., and Sastry, K., Goldberg, D. E., & Pelikan, M. "Efficiency Enhancement of Probabilistic Model Building Genetic Algorithms", Urbana, Ill.: University of Illinois at Urbana-Champaign, Illinois Genetic Algorithms Laboratory, 2004, which are incorporated by reference herein.

However, a serious stumbling block in developing surrogate fitness functions in iGAs is the absence of computable fitness function. Additionally, the user evaluation is relative, and user preference might change over time. Hence, conventional evaluation relaxation methods have fallen short and cannot effectively model user fitness function.

Therefore, preferred embodiments of the present invention provide evaluation relaxation systems and methods for actively combating user fatigue. Such systems and methods address issues such as the lack of computable fitness (a real fitness function) and lack of a systematic way for modeling a user-decision process, and take advantage of relative evaluations provided by the user to reduce the user fatigue.

Embodiments of the present invention provide methods for interactive computing, preferred examples of which are referred to herein as active interactive genetic algorithms (active iGAs). Active iGAs include steps of learning from human-computer interaction. Steps of using the learned knowledge to actively guide the search-based interaction process are performed.

In particular embodiments, active iGAs also quantify the consistency of users using them. Quantifying the consistency of a user helps establish confidence measures on the results obtained by a given user and actively intervenes in the interactive evolutionary process, helping the user to achieve high-quality solutions.

Preferred embodiments of the present invention rely on actively optimizing synthetic fitness functions. In a preferred iGA framework, user evaluations provide the necessary input for synthesizing a reasonably accurate surrogate fitness function that models user evaluations or, in other words, his/her decision preferences. User evaluations collected via a tournament selection provide partial-ordering relations between solutions. Preferred embodiments assemble a directed partial ordering graph of user evaluations.

Additionally, in such a directed graph, any contradictory evaluation provided by the user introduces a cycle in the graph. Exemplary embodiments provide methods to measure the consistency of the evaluations provided by the user along the evolutionary process.

In preferred embodiments of the present invention, a method for generating a synthetic fitness function is provided. General steps in exemplary methods include: 1) partial ordering, in which the qualitative decisions made by the user about relative solution quality are used to generate partial ordering of solutions; 2) induced complete order, employing concepts of non-domination and domination count to induce a complete order of the solutions in the population based on their partial ordering; and 3) a surrogate function, in which the induced order is used to assign ranks to the solutions and use them in a surrogate function to create a surrogate fitness function that effectively models user fitness. The properly trained model provided by a properly chosen surrogate function is able to satisfy two properties a synthetic fitness needs to satisfy—fitness extrapolation and order maintenance.

A non-limiting example of the surrogate function uses a regressor, such as an epsilon support vector regression ($\epsilon$-SVM), to create a surrogate fitness function that effectively models user fitness. Preferred active iGAs optimize such a synthetic fitness to obtain educated guesses of the user preferences, and thus reduce the number of user evaluations required.

Additionally, by augmenting user evaluations with a synthetic fitness function, user fatigue is reduced. Actively optimizing the synthetic fitness, such as, but not necessarily, by using a compact genetic algorithm (cGA), produces a population of candidate solutions. The injection of such candidate solutions into the user evaluation process effectively reduces the number of evaluations required on the user side until convergence. For example, by reducing the number of user evaluations needed (e.g., 3-7 times fewer evaluations), exemplary embodiments of the present invention can actively combat user fatigue. Synthetic fitness produced from the exemplary active iGA may also be used as an add-on to existing optimization techniques by supplementing the tournaments based on user input. Such optimization techniques are not limited to GAs.

Embodiments of the invention can also include a step of detecting user fatigue. If, for example, a user is found to make an inconsistent or contrary selection (e.g., selects A over B, B over C, but then selects C over A), an exemplary method may include notifying the user, discounting results, or taking other actions.

Inducing a synthetic fitness allows one to exploit different time scales involved in an iGA. Computing a synthetic fitness value may take several orders of magnitude less time than a typical user evaluation. This significant disparity in evaluation times allows one to evolve the population with surrogate fitness alone and to show the user potentially high-quality solutions.

Exemplary methods allow use of larger population sizes required to obtain high-quality solutions, which otherwise is at least improbable, if not impossible. Such methods also speed up the iGA process and thereby help avoid user fatigue. Additionally, preferred methods present potentially high-valued solutions for user evaluation, thus avoiding user frustration. An exemplary model can also be regarded as a useful insight into the user preferences.

The use of iGAs allows the fusion of human and computer efforts for problem solving. However, putting the evaluation process into the hands of a user sets up a different scenario when compared to normal optimization. Research efforts related to the iGA's challenges reveal five general facets that influence iGAs in providing an effective solution:

Clear goal definition: A precise description of the goal to the user is helpful to assist the user in engaging a successful innovation process. A clear definition, e.g., clear criteria for the goal being reached, helps evolve high-quality solutions. Moreover, if such definition is maintained along the run, the user's task is greatly simplified.

Impact of problem visualization: The solutions presented to the user should be understandable and comparable. If the visualization is too complex, the user will be overwhelmed with details, which can mislead the user's evaluations. If there is no simple way to compare solutions qualitatively, the user may not be able to make a proper decision. Generally, if such qualitative comparison is not easy, the quality of the user evaluations will decrease and greatly penalize the performance of the iGA.

Lack of real fitness: iGAs lack a quantitative fitness function analogous to the one used in traditional GAs. The qualitative nature of the evaluation process usually leads to evaluation scenarios where the user is asked to provide solution rankings or relative evaluations among a selected subset of solutions. Thus, conventionally there has been no numeric form that can be optimized.

Fatigue: User fatigue is a critical element to produce high-quality solutions. Long times until convergence (as a nonlimiting example, 1-2 hours) lead to tedious and demanding attention periods on the user side. Fatigue becomes the main reason for an early stop of the iGA process, and leads to low-quality solutions. Reliability of user evaluation also will likely suffer, further reducing the quality of the solutions, and itself adding to user fatigue, for example by resulting in repetitive evaluations.

Persistence of user criteria: The user can change his/her evaluation criteria along an iGA leading to a noisy evaluation scenario. Though it may be easy to maintain a unique criteria for a short time period, the user criteria may drift along the run, leading to a dynamic optimization scenario. Methodologies for helping the user to maintain the persistence of his/her evaluation criteria along the iGA run is thus significant.

The exemplary active iGA method described above focuses on at least two of these facets: the lack of a real fitness and user fatigue. It takes advantage of the relative evaluations provided by the user to reduce the user fatigue by actively learning from the user interaction with the evolutionary process.

Active iGAs rely on learning from the interaction from the user and anticipating what hypotheses the user may be interested in via "educated guesses". Generally, an active iGA mines the information provided by the user and uses the obtained knowledge to guide the breeding process of new solutions in an educated manner. In preferred embodiments, this is accomplished partly by addressing several aspects of interaction with the user.

Conventional efficiency enhancements assume the existence of an objective fitness function that can be computed without any human intervention. Such a requirement cannot be fulfilled under the conventional iGA's paradigm. Moreover, the qualitative nature of the evaluations in an iGA also fosters other issues that need to be addressed.

For instance, if an iGA run involves two different parallel evaluators, the iGA needs to deal with two different subjective evaluation criteria. Thus, no assumption should be made about the coherence of such criteria across the parallel evaluators, and multimodal and multiobjective approaches may be needed to deal with such situations.

Several techniques have been used to collect the user's subjective evaluation. Ranking of solutions, quality measurement of the solution in a 0 to 100 scale, or selecting a subset of the promising solutions from a pool are a few alternatives proposed since the origin of iGAs. Each of these methods have their advantages and disadvantages, combining different evaluation and selection schemes.

Tournament selection, such as that described in Goldberg, D. E., Korb, B., and Deb, K., "Messy genetic algorithms: motivation, analysis, and first results", Complex Systems, 3(5), 1989, pp. 493-530, is one of the most widely used ordinal selection schemes for GAs. In tournament selection, a specified number of individuals, s, is selected from the current population of size n. The best individual out of the s individuals gets a copy in the mating pool. The selection of the s individuals can be performed either with replacement or without replacement. In selection with replacement, the individuals selected from the current tournament are candidates for other tournaments. On the other hand, in selection without replacement, the individual, once selected, is not a candidate for other tournaments.

Such a selection scheme replaces the need for collecting a numeric evaluation from the user. Instead, an iGA under a tournament scheme with replacement displays a set of individuals, and the user picks the best solution out of the s candidates shown. Evaluation of fitness thus is performed by comparison.

The simplest iGA scenario for the user, and the minimal scenario for collecting meaningful domain-independent information, is provided by a tournament selection of size $s=2$, where given two solutions the user is able to provide three possible outcomes: 1) the first solution is better than the second one; 2) the first solution is worse than the second one; and 3) both solutions are equal/don't know/don't care. For instance, given two solutions $s_1$ and $s_2$ in a given tournament, the user picks one of the solutions—$s_2$ for instance. This decision can be safely cast into fitness terms; the solution of $s_2$ is better than the one of $s_1$, hence, $f(s_2) > f(s_1)$. Such interpretation introduces a partial ordering among solutions.

Exemplary embodiments of the present invention use a partial ordering (partial user evaluation) to compute a numerical synthetic subjective fitness. Any attempt to synthesize a subjective fitness based on the partial order provided by the user preferably should at least partially satisfy, at least, two properties: 1) fitness extrapolation; and 2) order maintenance. However, it is contemplated that in certain methods of the present invention, it may be possible to save computational resources by not fully enforcing one or both of these requirements.

The first property, fitness extrapolation, requires that the synthetic fitness provide meaningful inferences, e.g., ordering relations, beyond the boundaries of the current partial order provided by the user. Fitness extrapolation guarantees that any attempt to optimize such surrogate fitness will provide a useful guess of the user's future evaluations.

The second property, order maintenance, guarantees that a synthetic fitness is accurate if it maintains the partial ordering of solutions given by the user decisions. Thus, if $s_1 \geq s_2 \geq \ldots \geq s_n$ then $f_s(s_1) \geq f_s(s_2) \geq \ldots f_s(s_n)$. Such assumptions allow one to use low-cost high-error modules, as long as they maintain the proper ordering.

Nearest-neighbor models (e.g., see Takagi, H., Interactive evolutionary computation: Fusion of the capabilities of EC optimization and human evaluation, Proceedings of the IEEE, 89(9), 2001, pp. 1275-1296) have been used for synthetic fitness. However, such models may not satisfy the above two synthetic fitness properties. Such models assume that given a set of user-evaluated solutions, the fitness of a new solution may be estimated as the fitness of the closest evaluated solutions—using some distance metric. Other approaches average the fitness of the k-nearest solutions. It is easy to prove that such schemes may easily violate both of the previous properties.

Figure 1:
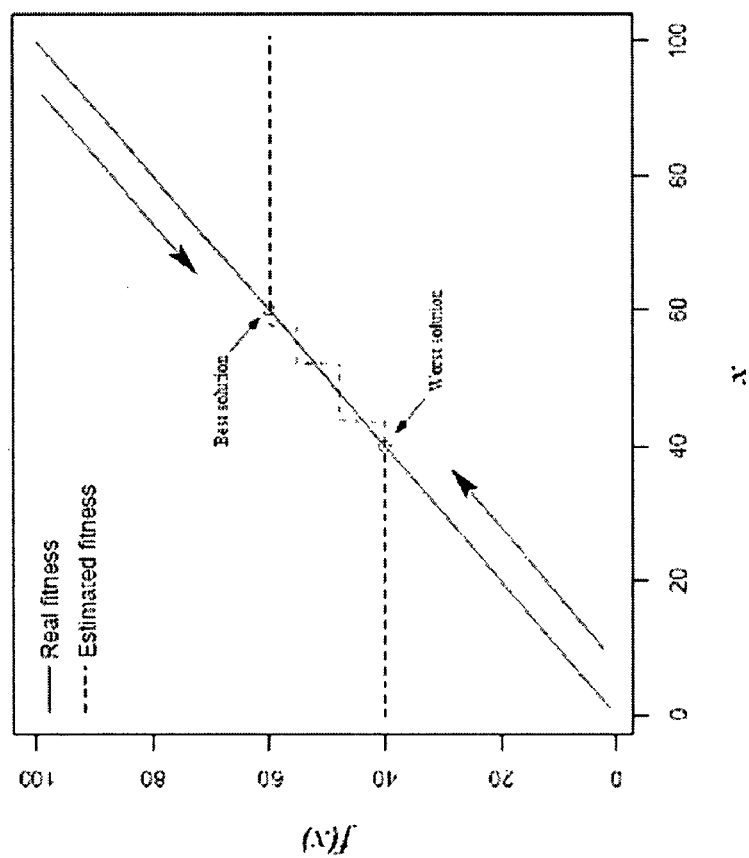
FIG. 1 shows real and estimated fitness for a OneMax function in which fitness extrapolation is provided by a nearest-neighbor surrogate model heuristic.

For example, no fitness extrapolation may be provided by such nearest-neighbor surrogate heuristic. FIG. 1 illustrates such situation with a simple OneMax counterexample. Any finite randomly generated population will be bounded by two solutions—the ones with the best and worst evaluated fitness. If one optimizes such a synthetic fitness, the final population may converge (in the best case) around the best solution in the nearest neighbor model. This happens because all the potential new good solutions (top-right portion of the line in FIG. 1) are equally evaluated, not providing any useful insight on unseen good candidate solutions.

Moreover, weighted nearest-neighbor heuristics may also violate the partial ordering property. Assume one is using a 3-nearest neighbor equally-weighted heuristic, and the three user-evaluated closest solutions to a new unseen solution $x=41$ are: $s_0=\{40, 40\}$, $s_1=\{42, 42\}$, and $s_2=\{45, 45\}$. The estimated fitness $$\hat{f}(x) \text{ is } \hat{f}(x) = \frac{1}{3}(40 + 42 + 45) = 42.33.$$

Using this result, we may infer that $f(42) < \hat{f}(41)$, violating the inherent ordering of the problem.

Another surrogate model commonly used as a synthetic fitness function is based on regressors, for example neural networks. An exemplary embodiment of the present invention uses a generalized regression model, the $\epsilon$-insensitive regression ($\epsilon$-SVM). A detailed description of $\epsilon$-SVM may be found, for example, in Cristianini, N., and Shawe-Taylor, J., An Introduction to Support Vector Machines, Cambridge Press, 2000, and Shawe-Taylor, J. and Cristianini, N., Kernel Methods for Pattern Analysis, Cambridge Press, 2004, which are incorporated herein by reference. A synthetic fitness based on $\epsilon$-SVM using a linear kernel easily satisfies the fitness extrapolation and order maintenance properties. However, it will be appreciated that other methods that can be used to fit a curve (function approximation), such as, but not limited to, neural networks, linear regression, non-linear regression, genetic programming, machine learning techniques, fuzzy logic, etc., may be used for a synthetic fitness function.

FIG. 2 illustrates how such fitness extrapolates beyond the boundaries provided by the user-evaluated solutions thanks to the hyper-plane adjustment done by $\epsilon$-SVM. Moreover, even with a high-regression error, a $\epsilon$-SVM guarantees the proper ordering of solutions under a tournament selection scheme. For instance, given the example of FIG. 2, any hyper-plane ($y=m \cdot x+c$) with a positive slope $m>0$ guarantees the proper ordering of the synthetic fitness. Using the previous example, $s_0=\{40, 40\}$ and $s_1=\{42, 42\}$, $$s_0 < s_1 \rightarrow \hat{f}(s_0) < \hat{f}(s_1) \text{ iff } (m \cdot x_{s_0}+c) < (m \cdot x_{s_1}+c)$$

holding when $m>0$. Hence, high-order surrogate models are synthetic fitness candidates, as long as the training examples are properly ordered.

Figure 4:
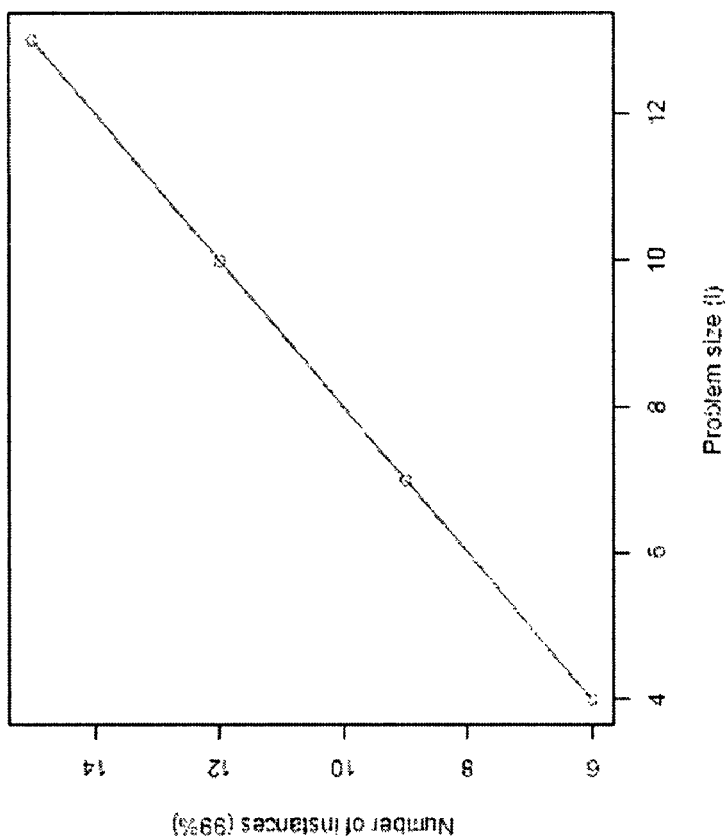
FIG. 4 shows a number of samples required to build a perfect ordering using an epsilon-SVM as a function of the problem size.
Figure 3:
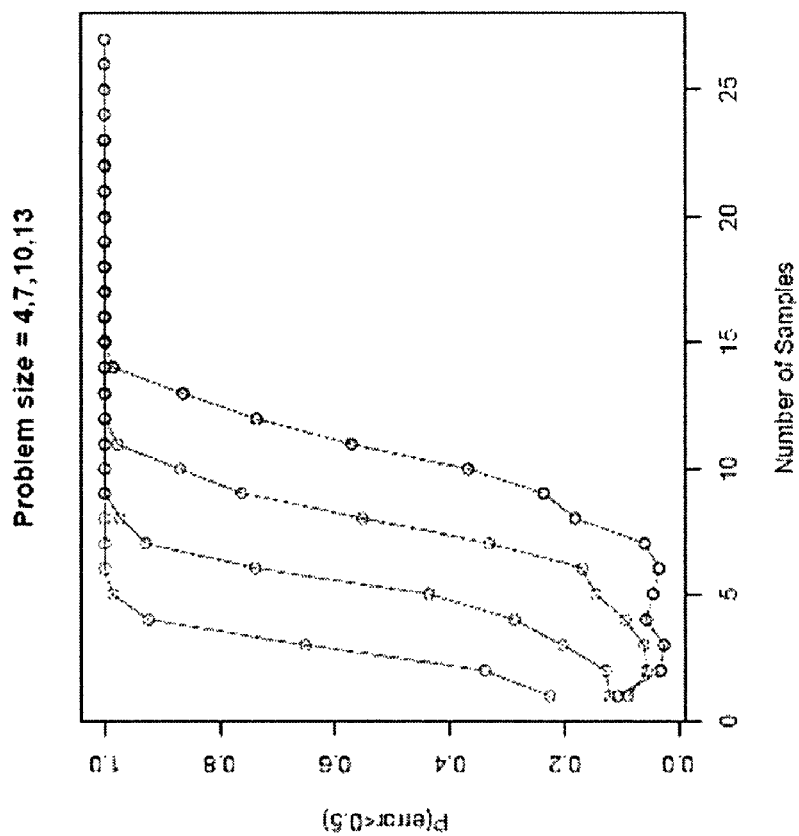
FIG. 3 shows a probability of perfect ordering by an epsilon-SVM as a function of sampled solutions.

The minimal number of user evaluations needed to obtain a surrogate $\epsilon$-SVM subjective fitness model that guarantees both properties is shown in FIG. 3. Given a problem with no dependencies among decision variables, OneMax, a set of evaluated solutions is sampled at random to synthesize a fitness by training a $\epsilon$-SVM regressor. FIG. 3 displays the probability of perfect global ordering by the $\epsilon$-SVM fitness as a function of the number of sampled instances. Results are averaged among 1000 independent runs. Given a problem size l, there is a minimal number of samples required to infer a property-compliant synthetic fitness. Moreover, such minimal number of solutions grow as l+2, as FIG. 4 shows. Such results are completely consistent with the theoretical PAC bounds of $\epsilon$-SVM, which requires at least the number of training examples to grow linearly with the number of dimensions of the problem.

These results hold for problems where no linkage among the decision variables is present. If linkage among variables is present, such as linkage described in Thierens, D., and Goldberg, D. E., Mixing in Genetic Algorithms, Proceedings of the Fifth International Conference in Genetic Algorithms, 1993, pp. 38-45, and Harik, G., Linkage Learning via Probabilistic Modeling in the ECGA, Urbana, Ill.: University of Illinois at Urbana-Champaign, Illinois Genetic Algorithms Laboratory, 1999, then a polynomial kernel may be required by the ε-SVM to satisfy the fitness extrapolation and order maintenance properties.

Exemplary embodiments of the present invention exploit user interaction with a selection process. People use computers to make decisions all the time. Aspects of the present invention can exploit these decisions to achieve benefits and advantages. For example, users may be presented with two alternative solutions to a problem and asked to select the better one. Through multiple iterations, a model (such as a predictive or probabilistic one, genetic or evolutionary) may be built of the user behavior. One exemplary way to build the model is through what is referred to as "modeling partial positions". The positions of an overall population are "partial" since they have been presented to the user, for example, on an A-or-B basis (two at a time). In this way, while a preference between A and B is known, that between A and C or D is not. Rules of logic can be used to predict preferences. Another step is to use a so-called partial position graph to model relations, examples of which are provided herein.

The surrogate models reviewed above make a basic assumption: the partial order of user evaluations can be translated into a global numeric value. If such a value is available, then a regressor, such as ε-SVM, provides an efficient synthetic fitness, which may be used to combat user fatigue. Thus, exemplary methods of the present invention provide, among other things, a way to turn the user-provided partial ordering among the different solutions into a numeric fitness value to synthesize the training examples of a regression model, such as, but not limited to, ε-SVM. As new evaluations are made, it is also preferable to incrementally refine the model.

In preferred embodiments of the present invention, dominance measures are used based on partial ordering to induce a complete order. This induced complete order is in turn used to train a regression model. In particular embodiments, dominance measures are used on a graph G of partially-ordered solutions.

Figure 5:
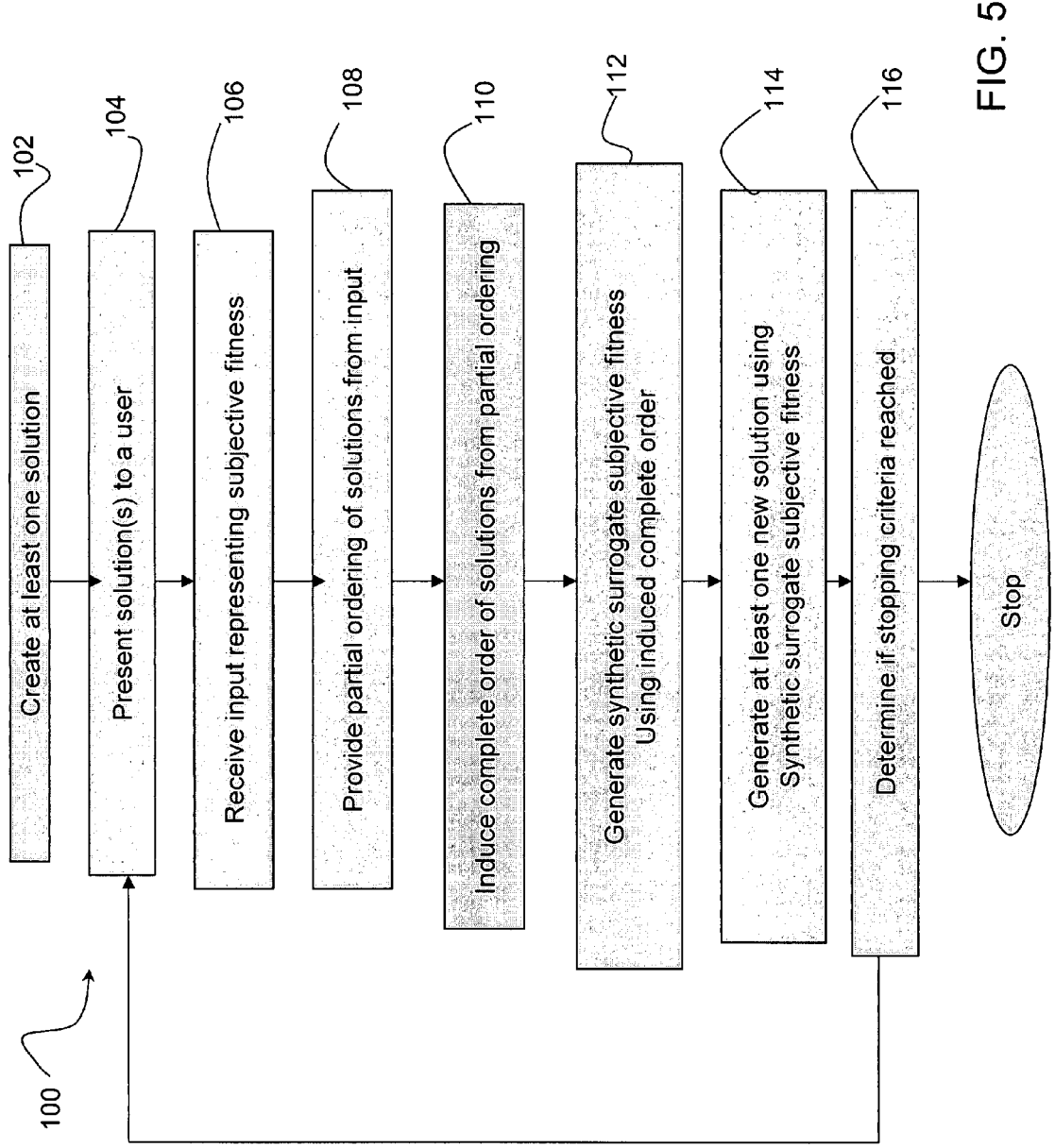
FIG. 5 shows an exemplary method for optimization, according to embodiments of the present invention.

Preferably, as shown in FIG. 5, at least one solution is created (step 102) and presented to a user (step 104). Preferably, to provide a relative (e.g., tournament) selection to a user, a plurality of solutions is created. However, a single (absolute) solution may alternatively be presented, for example, and given a subjective fitness by a user, for example numerical fitness, yes/no fitness, etc. It is also contemplated that a user may provide input on a solution that is presented, for example, outside of the exemplary method. For example, a solution may be created and/or presented via a third party before user input is received. In this case, steps 102 and 104 may be omitted in particular embodiments.

To provide a synthetic fitness, user input representing subjective fitness is received, such as by collecting one or more user evaluations for one or more created solution(s) (step 106), such as, but not limited to, via a tournament. A partial ordering of solutions is created based on the collected user evaluations (step 108). Partial ordering may be created, for example, by collecting and organizing user inputs according to user preferences. The partial ordering may be represented by a graph, for example. Complete ordering is induced based on the partial ordering (step 110). For example, numeric fitness may be computed for the solutions based on the partial ordering, and based on the computed numeric fitness, a complete order may be induced. The induced complete order is used to create (or refine) a synthetic surrogate subjective fitness (step 112). The synthetic surrogate subjective fitness preferably is a model in the form of an equation that provides a synthetic surrogate for user subjective fitness. Any method for numerical approximation may be used to create the model based on the induced complete order. As a nonlimiting example, the induced complete order may be used to train a regression model. This learned regression model provides the synthetic fitness.

At least one new solution is generated using the new synthetic surrogate subjective fitness (step 114). If stopping criteria are satisfied (step 116), the process ends. The stopping criteria determination step may occur at an earlier part of the process if desired. Otherwise, the newly generated solution(s) replaces some or all of the previous solution(s), depending on whether replacement is used for a particular method, to provide a new solution set. The new solution(s) is presented to the user (step 102), preferably along with one or more previously generated solutions, and the process continues until stopping criteria are satisfied.

Figure 6:
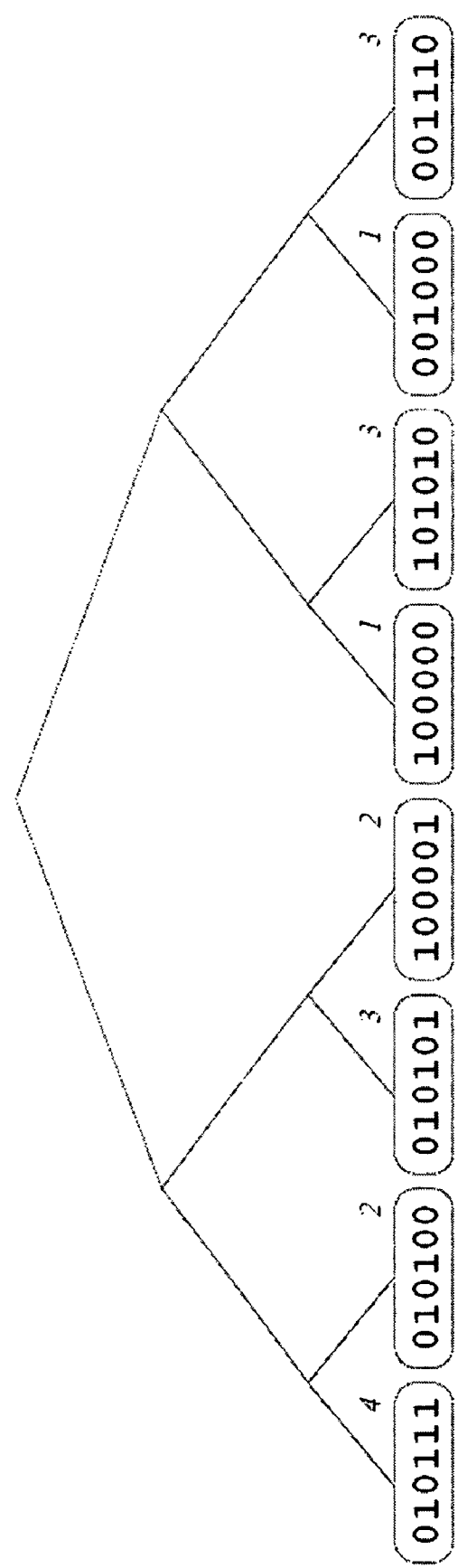
FIG. 6 shows an exemplary tournament structure for eight individuals from a population.

As a non-limiting example of presenting solutions to a user (step 102) and receiving input (step 104), in a tournament selection of size s=2, a user is asked to provide an answer to the question of which of two choices is better. The outcome of such question may be: the first shown, the second shown, or both are equal or the user was unable to decide. Assume an illustrative method where eight solutions (010111, 010100, 010101, 100001, 100000, 101010, 001000, and 001110) need to be evaluated as presented in FIG. 6. These eight randomly chosen individuals from a population can be presented as a sequence of seven different hierarchical tournaments: (010111, 010100); (010101, 100001); (100000, 101010); (001000, 001110); (010111, 010101); (100000, 001000); and (010111, 100000). In FIG. 6, the number beside each node simulates the objective function in the user's mind. User input regarding the tournament may be received via any of a variety of methods, such as, but not limited to, an interactive computer session.

Figures 7A, 7B:
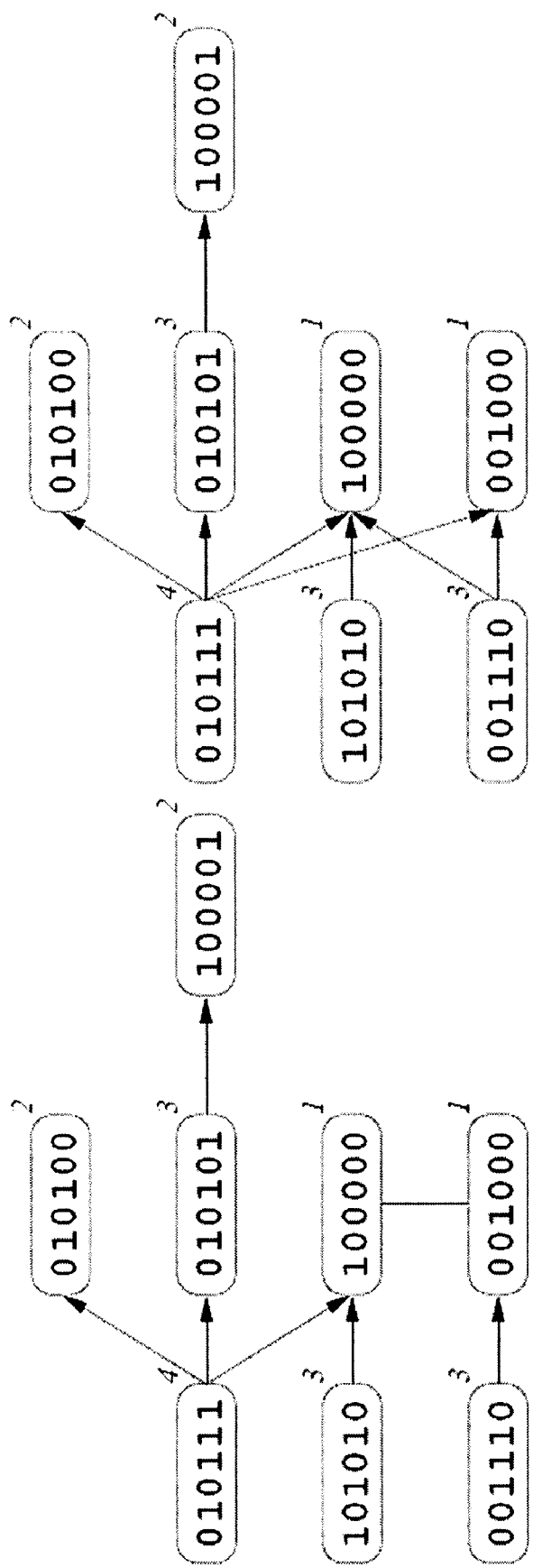
FIGS. 7A-7B show a partial ordering graph, and a normalized partial ordering graph, respectively, according to embodiments of the present invention.

The tournament ordering presented in FIG. 6 guarantees that the partial order introduced by the user evaluations can be expressed in a graph form, such as connected graph G, shown in FIG.7A. This is an example of providing a partial ordering of solutions based on the user input (step 108). Such graph G=<V, E > represents the partial evaluation order representing the solutions as a vertex in V, and the pair-wise comparison among individuals (greater, lesser, or equal) as edges in E. As shown in FIG.7A, the partial ordering graph provided by the user may be undirected (equal evaluations are allowed).

However, and preferably, such a graph can be easily transformed into a normalized directed graph, for example by replacing the equal (undirected edges) by the proper greater or lesser relations (directed edges), as FIG.7B shows. This makes it easier to induce complete ordering, and provides additional information regarding consistency of user evaluations.

To create a synthetic fitness, exemplary methods of the present invention next induce a complete order for the solutions (step 110) by using heuristics based on the partial ordering provided by user evaluations and the Pareto dominance concept of multiobjective optimization. A global ordering measure, as a nonlimiting example, may be computed using a heuristic based on two dominance measures, δ and φ. Define δ(v) (dominated vertices) as the number of different nodes present in the directed graph on the paths departing from vertex v. Analogously, φ(v) (dominating vertices) is defined as the number of different nodes present on the paths arriving to v.

Since the partial order is a directed graph, such mapping has an interesting property. If v appears more than once in a path of δ(v) or φ(v), then a cycle in such graph exists. Thus, due to the greater and lesser relations, a contradiction on the user evaluations is identified. Exemplary embodiments break such cycles by removing the oldest evaluation (edge) in the path. Alternative methods include, but are not limited to, maintaining the user evaluations and/or selecting among the contradictory results based, for example, on a ranking of probabilities of preferences between pairs of nodes. Other factors may include recency, statistical methods, properties of the graph, providing an interactive procedure allowing the user, other users, or an administrator (e.g., an expert) to decide between contradictory results, etc.

The table in FIG. 8 computes $\delta(v)$ or $\phi(v)$ using the partial order presented in the graph presented in FIG. 7B. In FIG. 8, given a vertex v, the number of dominated vertices and dominating vertices are computed. Using these measures, the estimated fitness of a given solution (vertex) v may be computed as $\hat{f}(v)=\delta(v)-\phi(v)$. Intuitively, the more solutions a solution v dominates (is greater than), the greater the fitness. Otherwise, the more solutions that dominate (are greater than) a solution v, the smaller the fitness. The final global estimated ordering $\hat{r}(v)$ is obtained by sorting the vertices $v \in S$ by $\hat{f}(v)$, as shown by example in FIG. 8, along with real fitness f(v) and ranking r(v). The estimated ranking introduces some spurious relations inside common ranks.

Once the global ordering is induced, such as via computing (estimated ranking $\hat{r}(v)$), such ordering may be used to create a synthetic surrogate subjective fitness (step 112). As a non-limiting example, the induced complete order may be used to train a regressor, such as the $\epsilon$-SVM. The model may vary, for example, depending on the user's preferences (e.g., by complexity of user preferences, etc.) Certain users, for example, experts, may require a more complex model, as they rely on additional decision factors. The model may be based only on the ranking, but it may also be mapped, for example, to fitness values. By optimizing such a synthetic fitness, it is possible to obtain a look ahead on candidate solutions to be evaluated by the user, for example, as the synthetic fitness provides a model based on user behavior.

In exemplary embodiments of the present invention, the synthetic fitness function may be combined with an iGA to reduce the number of human evaluations. The synthetic fitness, which is based on user input, is itself used to generate new solutions to the user in future iterations. An exemplary interactive computing method integrating the synthetic fitness function and an iGA is referred to herein as an "active iGA".

Generally, in an active iGA, a plurality of solutions is generated from a population to provide an initial solution set to create an empty directed graph. The initial solution set is presented to a user for evaluation, providing a hierarchical tournament set. For example, a tournament is created and presented to the user using the solutions in the solution set. The collected user input is used to provide or update partial ordering in the directed graph, and a complete ordering ranking is induced based on the partial ordering. The solutions and their ranking are used to train a surrogate synthetic fitness, for example by using a $\epsilon$-SVM. The synthetic fitness is optimized, for example by using cGA.

Based on the provided synthetic fitness, solutions in a new solution set are generated. For example, the synthetic fitness may be exploited by optimizing the synthetic fitness, sampling the best candidate or candidates, and presenting the best solutions to the user with other generated solutions for evaluation. Alternatively or additionally, the synthetic fitness may be sampled without optimizing. The steps are repeated until converging criteria is met. By supplementing solution sets with solutions provided by a synthetic subjective fitness function, the exemplary method provides an educated guess of user preferences. This reduces user fatigue by reducing the number of user evaluations needed to achieve convergence. Also, by producing better solutions, exemplary embodiments reduce user frustration.

More particularly, the general steps in an exemplary active iGA, as shown in FIG. 9, are:

1) create an empty directed graph G=<V, E>.

2) create $2^h$ random initial solutions (V set)

3) create the hierarchical tournament set T using the available solutions in V.

4) present the tournaments in T to the user and update the partial ordering in E.

5) Estimate $\hat{r}(v)$ for each $v \in V$.

6) Train the surrogate $\epsilon$-SVM synthetic fitness based on G and $\hat{r}(v)$.

7) Optimize the $\epsilon$-SVM synthetic fitness.

8) Create a V' set with $2^{h-1}$ new different solutions, where $V \cap V'=0$, sampling out of the evolved probabilistic model.

9) Create hierarchical tournament set T' with $2^{h-1}$ tournaments using $2^{h-1}$ solutions in V and $2^{h-1}$ solutions in V'.

10) $V \leftarrow V \cup V'$.

11) $T \leftarrow T \cup T'$.

12) Go to 4) while stopping criteria is not met.

Given the theoretical framework used in the exemplary embodiments described above (OneMax and $\epsilon$-SVM using a linear kernel), an estimation of distribution algorithm, such as but not limited to the compact GA (cGA) is a suitable option to optimize the synthetic fitness. Similar to other EDAs, cGA replaces traditional variation operators of GAs by building a probabilistic model of promising solutions and sampling the model to generate new candidate solutions. The probabilistic model used to represent the population is a vector of probabilities, and therefore implicitly assumes each gene (or variable) to be independent of the other. Particularly, each element in the vector represents the proportion of ones (and consequently zeros) in each gene position. The probability vectors are used to guide further search by generating new candidate solutions variable by variable according to the frequency values.

A cGA, for example, may include the following steps:

1) Initialization: As in simple GAs, where the population is usually initialized with random individuals, in cGA one starts with a probability vector where the probabilities are initially set to 0.5. However, other initialization procedures can also be used in a straightforward manner.

2) Model sampling: Two candidate solutions are generated by sampling the probability vector. The model sampling procedure is equivalent to uniform crossover in simple GAs.

3) Evaluation: The fitness or the quality measure of the individuals is computed.

4) Selection: Like conventional GAs, cGA is a selectionist scheme, because only the better individual is permitted to influence the subsequent generation of candidate solutions. A "survival-of-the-fittest" mechanism is used to bias the generation of new individuals. Tournament selection, for example, the method described in Goldberg, Korb, & Deb, 1989, is usually used in cGA.

5) Probabilistic model updating: After selection, the proportion of winning alleles is increased by 1/n. Only the probabilities of those genes that are different between the two competitors are updated. That is, $$p_i^{t+1} = \begin{cases} p_i^t + 1/n & \text{If } x_{w,i} \neq x_{c,i} \text{ and } x_{w,i} = 1, \\ p_i^t - 1/n & \text{If } x_{w,i} \neq x_{c,i} \text{ and } x_{w,i} = 0, \\ p_i^t & \text{Otherwise.} \end{cases}$$

Where, $x_{w,i}$ is the $i^{th}$ gene of the winning chromosome, $x_{c,i}$ is the $i^{th}$ gene of the competing chromosome, and $p_i^t$ is the $i^{th}$ element of the probability vector—representing the proportion of $i^{th}$ gene being one—at generation t. This updating procedure of cGA is equivalent to the behavior of a GA with a population size of n and steady-state binary tournament selection.

6) Repeat steps 2)-5) until one or more termination criteria are met.

The cGA is described in more detail, for example, in Harik, G., Lobo, F. and Goldberg, D. E., "The compact genetic algorithm", Proceedings of the IEEE International Conference on Evolutionary Computation, 1998, pp. 523-528; and Harik, G., Cantú-Paz, E., Goldberg, D. E., & Miller, B. L., "The gambler's ruin problem, genetic algorithms, and the sizing of populations", Evolutionary Computation, 7(3), 1999, pp. 231-253, and thus a more detailed explanation will be omitted herein. The exemplary cGA is operationally equivalent to the order-one behavior of a simple genetic algorithm with steady state selection and uniform crossover. Therefore, the theory of simple GAs can be directly used to estimate the parameters and behavior of the cGA. Many other optimization methods such as but not limited to linear programming, non-linear programming, metaheuristics, genetic and evolutionary algorithms, operations research (OR) methods, machine learning methods, artificial intelligence methods, etc. can be used in place of cGA.

Figure 10:
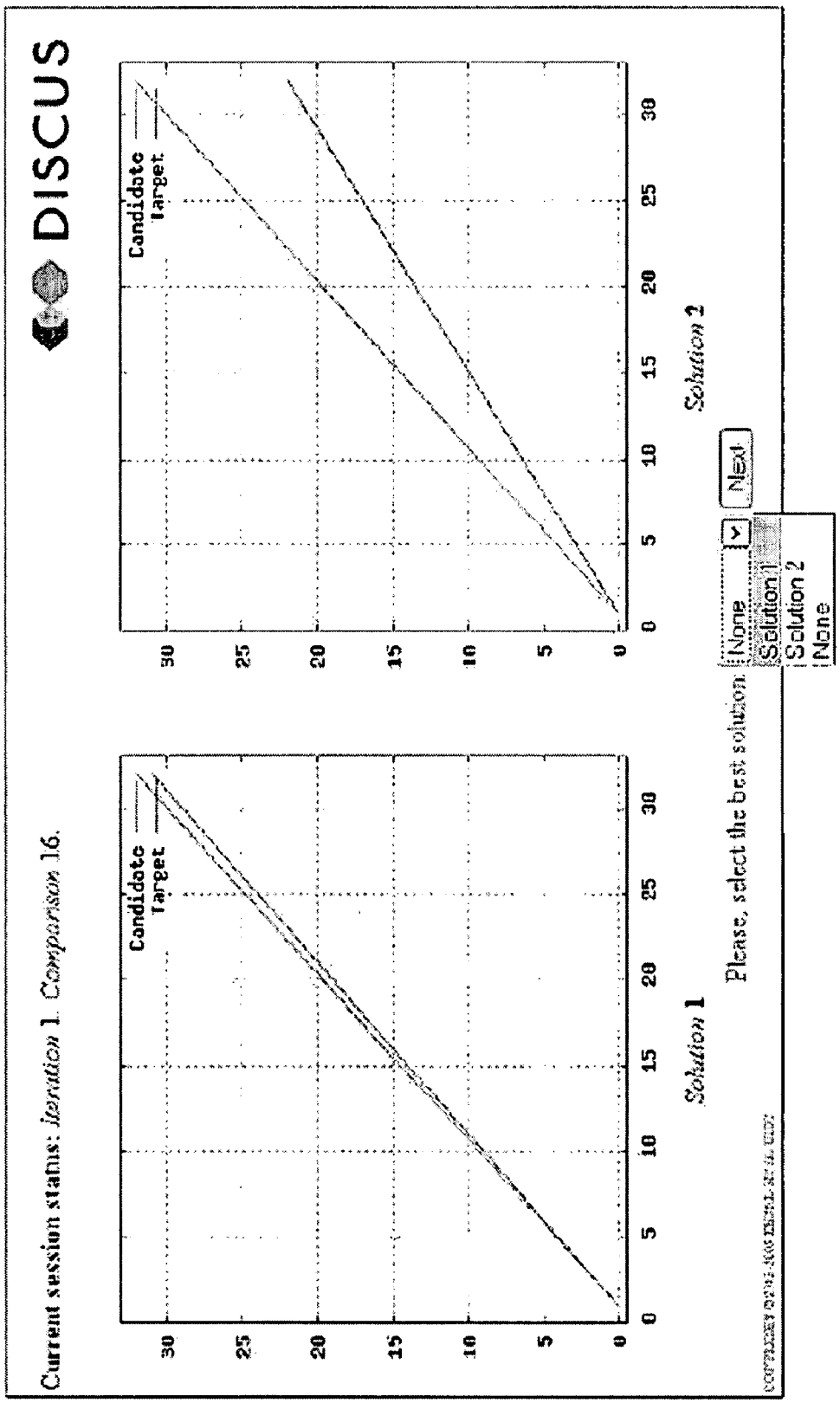
FIG. 10 shows an exemplary interface for receiving user input.

A simple web interface was created to test the performance of the exemplary active iGA described above. The interface was designed to minimize the interference bias, providing a clear goal definition, simple problem visualization, and a clear relative comparison method to help maintain the user criteria. FIG. 10 shows a snapshot of an iGA session using the exemplary active iGA.

To collect unbiased results, a user with no experience in evolutionary methods or interactive optimization was selected to perform the experimentation. The underlying problem to be solved was OneMax given different problem sizes l={4, 8, 12, 16, 20, 24, 28, 32}. The user did not know the underlying problem to be solved. For each problem size, 10 independent runs were conducted by the user. Such results were collected, averaged, and later analyzed and compared against the usage of a theoretical iGA based on the simple GA.

Analysis begins by considering the scalability of selectorecombinative GAs followed by the scalability of the exemplary active iGA. Two factors for predicting the scalability and estimating the computational costs of a GA are convergence time and population sizing. Therefore, facet-wise models of convergence time and population sizing will now be briefly described.

Goldberg, D. E., Deb, K., and Clark, J. H., "Genetic algorithms, noise, and the sizing of populations", Complex Systems, 6, 1992, pp. 333-362, proposed population-sizing models for correctly deciding between competing building blocks (BBs). They incorporated noise arising from other partitions into their model. However, they assumed that if wrong BBs were chosen in the first generation, the GAs would be unable to recover from the error. Harik, G., Cantú-Paz, E., Goldberg, D. E., & Miller, B. L., "The gambler's ruin problem, genetic algorithms, and the sizing of populations", Evolutionary Computation, 7(3), 1999, pp. 231-253, refined the above model by incorporating cumulative effects of decision-making over time rather than in first generation only. They modeled the decision-making between competing BBs as a gambler's ruin problem. Here, we use an approximate form of the gambler's ruin population-sizing model:

$$n = \frac{\sqrt{\pi}}{2} \frac{\sigma_{BB}}{d} 2^k \sqrt{m} \log m \sqrt{\left(1 + \frac{\sigma_N^2}{\sigma_f^2}\right)},$$

where k is the BB size, m is the number of BBs, d is the size signal between the competing BBs, $\sigma_{BB}$ is the fitness variance of a building block, $\sigma_N^2$ is the variance of the noise, and $\sigma_f^2$ is the fitness variance. The above equation assumes a failure probability $\alpha=1/m$.

Mühlenbein, H., and Schlierkamp-Voosen, D., "Predictive models for the breeder genetic algorithm: I. continuous parameter optimization", Evolutionary Computation, 1(1), 1993, pp. 25-49, derived a convergence-time model for the breeder GA using the notion of selection intensity from population genetics. Thierens, D., and Goldberg, D. E., "Convergence models of genetic algorithm selection schemes", Parallel Problem Solving from Nature, 3, 1994, pp. 116-121, derived convergence-time models for different selection schemes including binary tournament selection. Back, T., "Selective pressure in evolutionary algorithms: A characterization of selection mechanisms", Proceedings of the First IEEE Conference on Evolutionary Computation, 1994, pp. 57-62, derived estimates of selection intensity for s-wise tournament and $(\mu, \lambda)$ selection. Miller, B. L., and Goldberg, D. E., "Genetic algorithms, tournaments selection, and the effects of noise", Complex Systems, 9(3), 1995, pp. 193-212, developed convergence-time models for s-wise tournament selection and incorporated the effects of external noise. Bäck, T., "Generalized convergence models for tournament—and $(\mu, \lambda)$—selection", Proceedings of the Sixth International Conference on Genetic Algorithms, 1995, pp. 2-8, developed convergence-time models for $(\mu, \lambda)$ selection. Even though the selection-intensity-based convergence-time models were developed for the OneMax problem, it has been observed that they are generally applicable to additively decomposable problems of bounded order.

In an exemplary analysis, we use an approximate form of a convergence-time model disclosed in Miller, B. L., and Goldberg, D. E., 1995, and Goldberg, D. E., "The design of innovation: Lessons from and for competent genetic algorithms", 2002:

$$t_c = \frac{\pi}{2I} \sqrt{m} \sqrt{1 + \frac{\sigma_N^2}{\sigma_f^2}},$$

where I is the selection intensity, and l=mk is the string length. For binary tournament selection, $I=1/\sqrt{\pi}$. Additional detail regarding the above equation and other approximations is provided, for example, in Goldberg, D. E., 2002, and Sastry, K., "Evaluation-relaxation schemes for genetic and evolutionary algorithms", Master's thesis, University of Illinois at Urbana-Champaign, General Engineering Department, Urbana, Ill., 2001.

Using the above two equations, we can now predict the scalability, or the number of function evaluations required for successful convergence, of a GA as follows:

$$n_{fe,GA} = \frac{\pi^2}{4} \frac{\sigma_{BB}}{d} \sqrt{k} \log m \cdot \left(1 + \frac{\sigma_N^2}{\sigma_f^2}\right) \cdot 2^k \cdot m.$$

Figure 11:
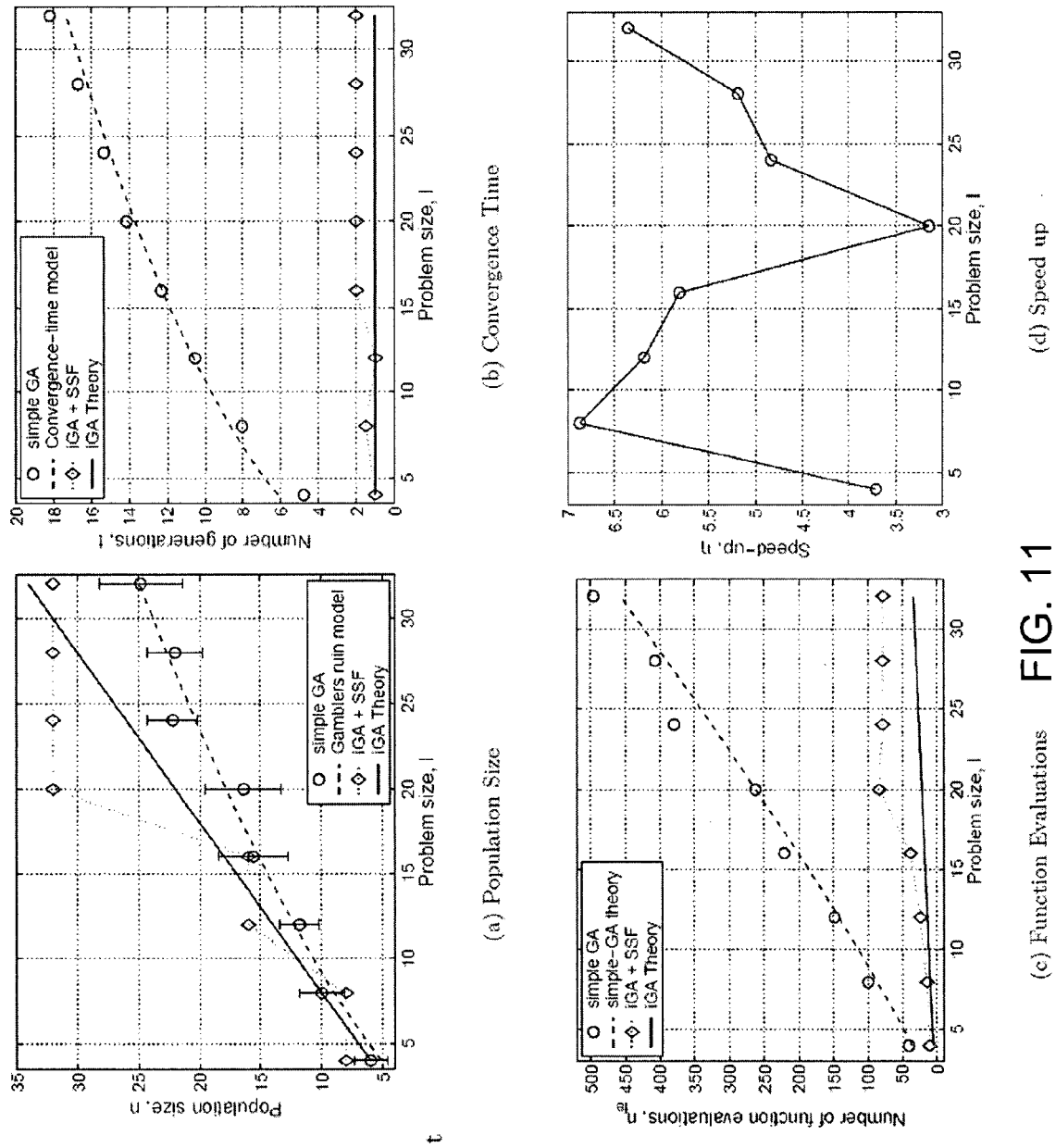
FIG. 11 shows population size, convergence time, number of function evaluations, and speed up results for active iGA and a simple iGA.
Figure 13:
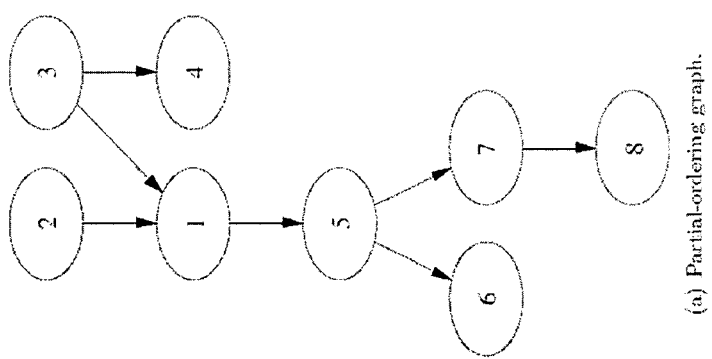
FIGS. 13-16 shows synthetic fitness and consistency measure for an active iGA at iterations 1-4, respectively.
Figure 14:
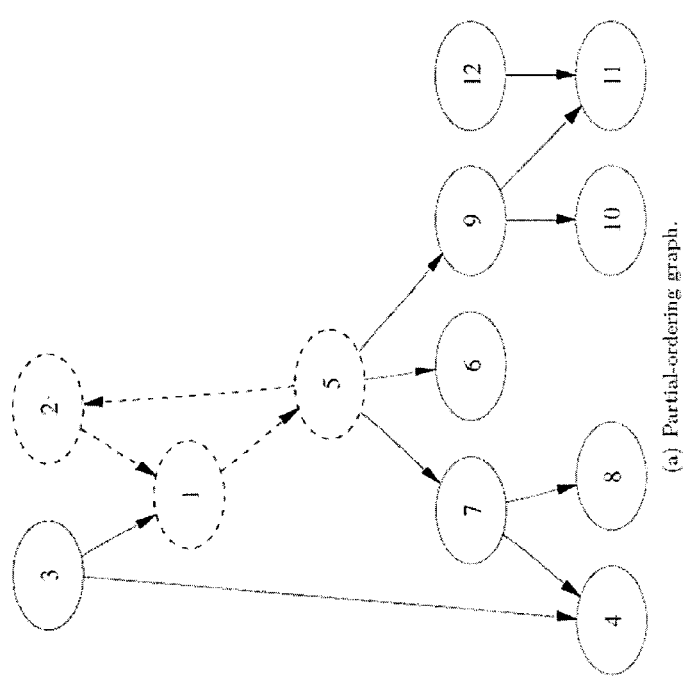
Figure 15:
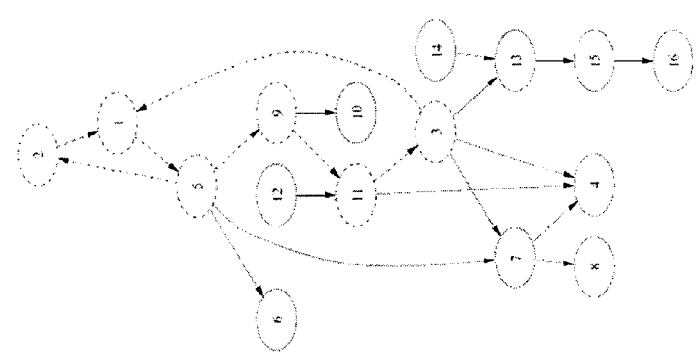
Figure 16:
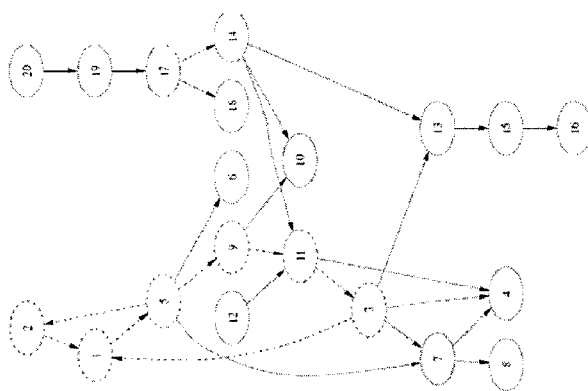
Figure 18:
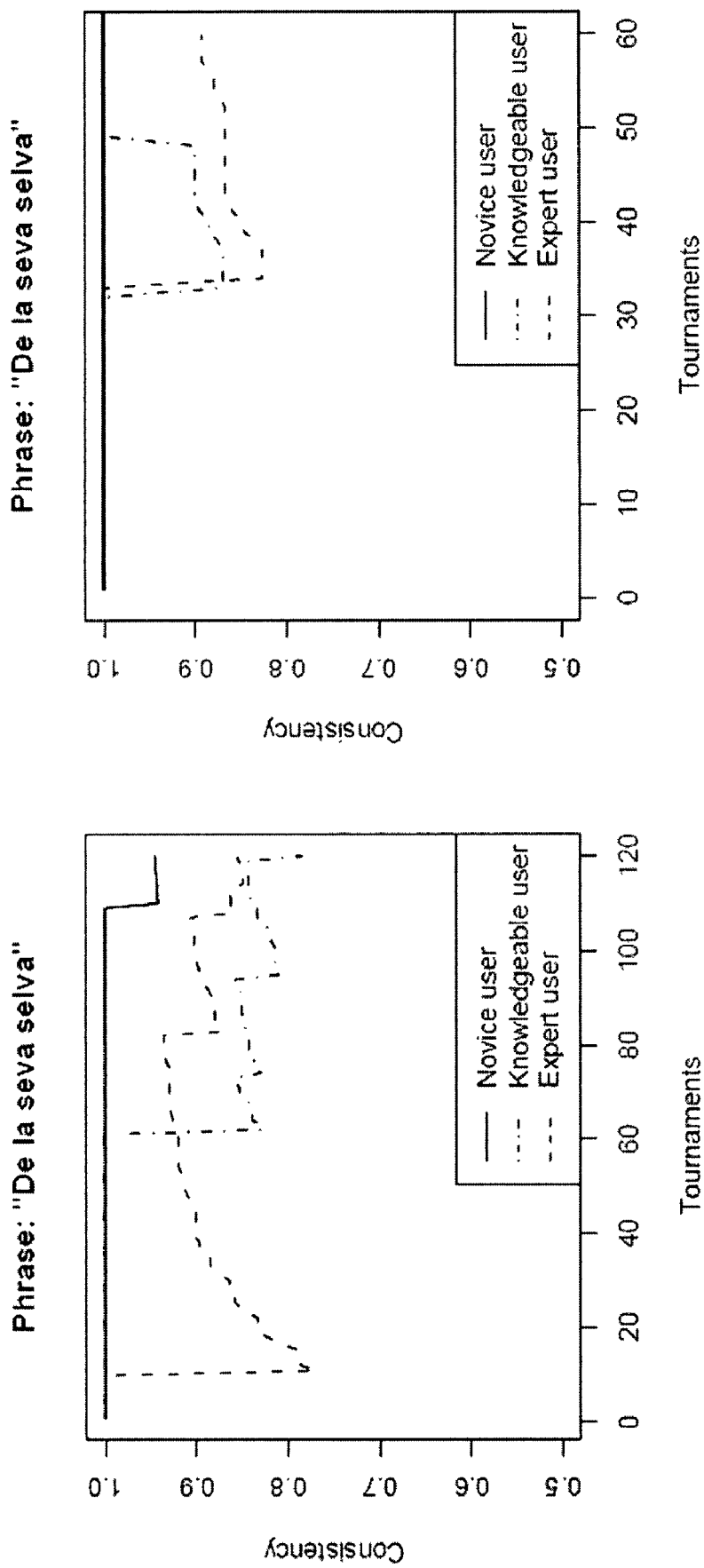
FIGS. 18-21 show user consistency for an experimental text to speech (TTS) run for the phrases "De la seva selva", "Fusta de Birmània", "I els han venut", and "Grans extensions", respectively, using a simple iGA and an active iGA according to embodiments of the present invention.
Figure 19:
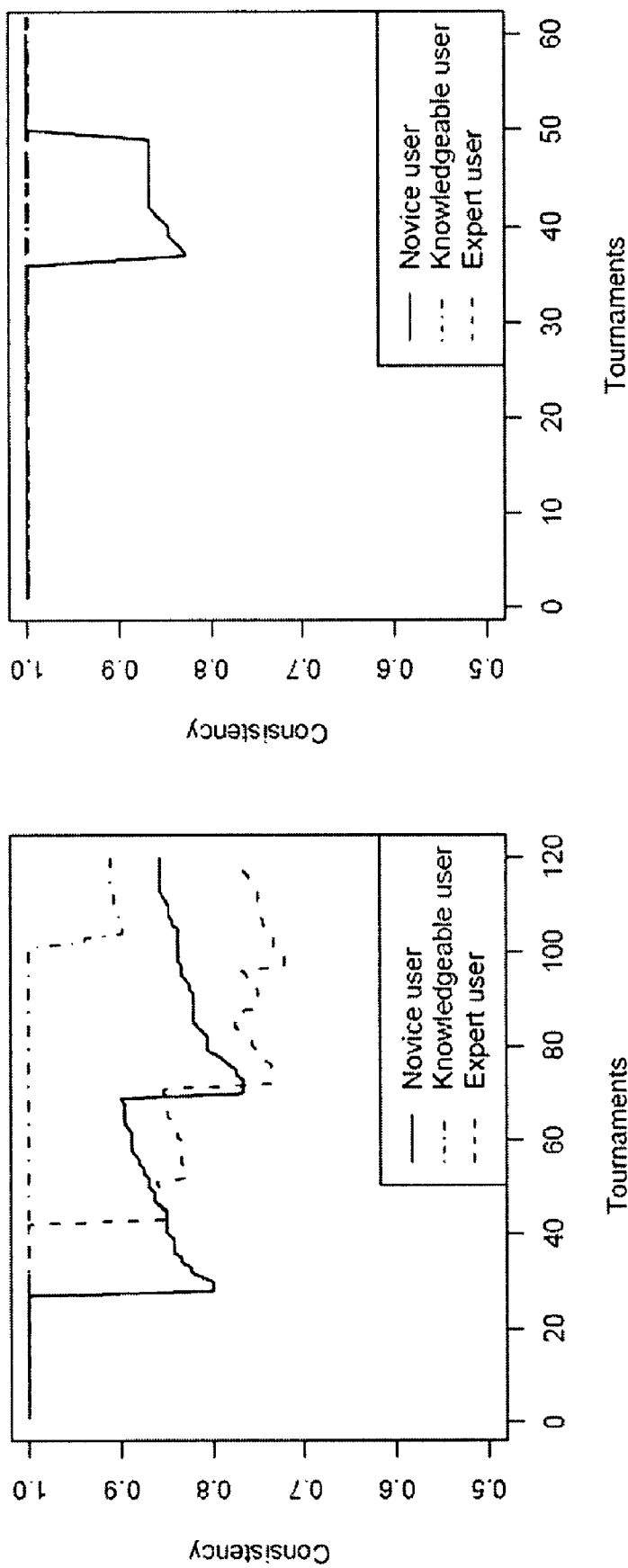
Figure 20:
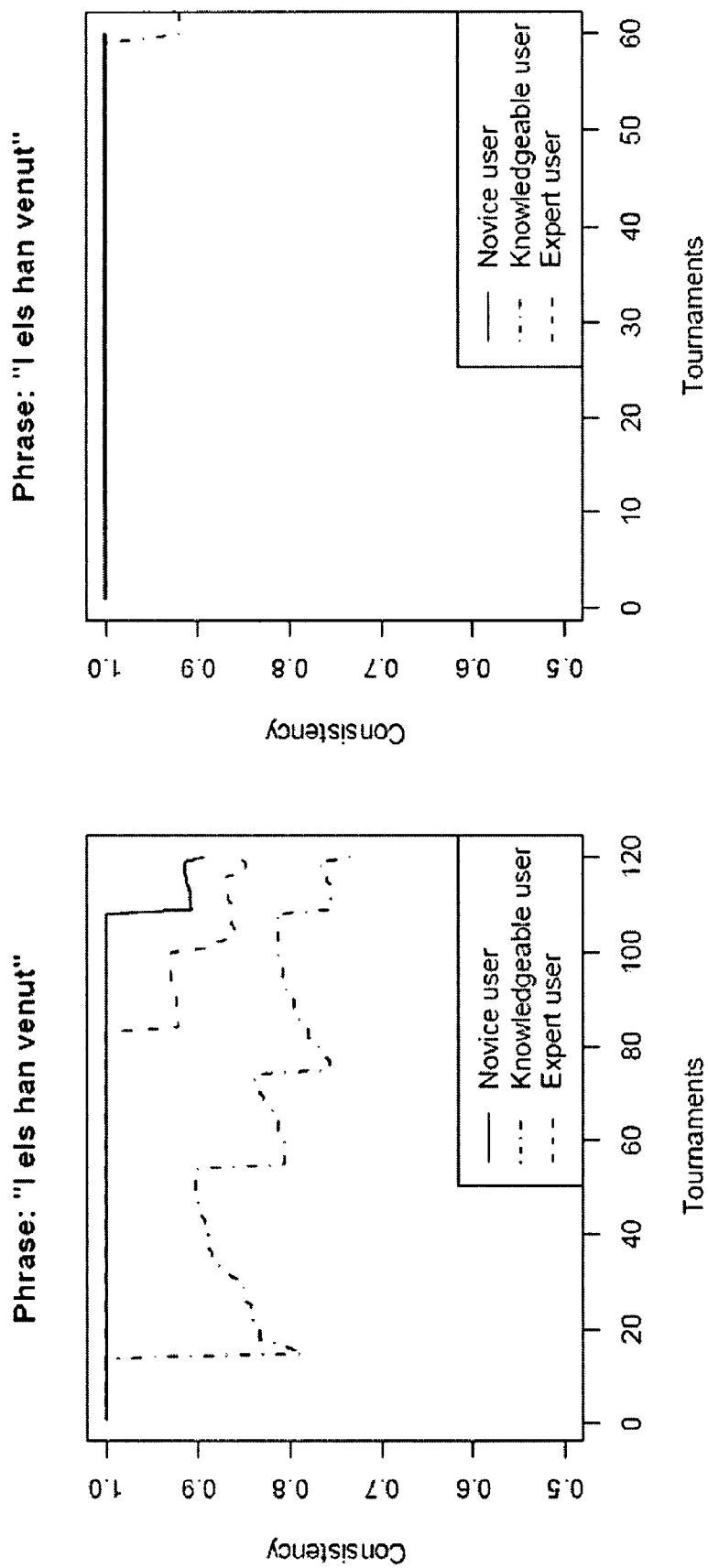
Figure 21:
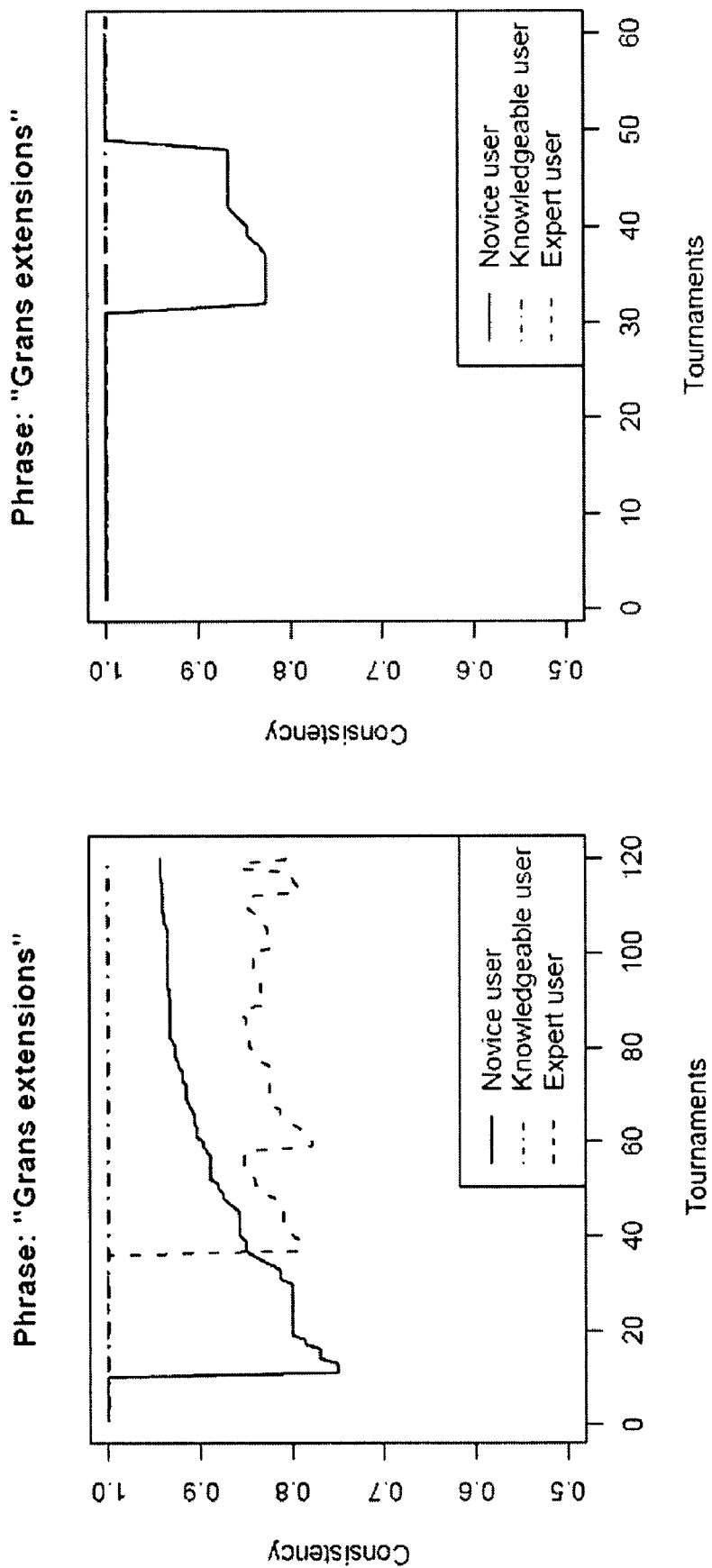

One difference resulting from using a synthetic fitness function is the population size requirements. FIG. 11A presents the population sizing of a simple GA and the one of the iGA. As can be seen, the iGA requires a population size that, at least, grows linearly. Such requirement is the result of using a ϵ-SVM with a polynomial kernel, which requires at least as many training examples as dimensions (l in the iGA case) as shown previously. Moreover, the active iGA population is also constrained by the tree tournament structure, so that given a problem size l the population size is forced to grow $2^{\lceil \log_2(l) \rceil}$.

FIG. 11B compares the convergence time of an active iGA to a simple iGA. Based on the results presented above, the theoretical convergence time of the active iGA with the proper population sizing should be constant. The empirical results shown in FIG. 11B support such assumption. Combining the population sizing and the convergence time, the number of function evaluations of the active iGA should grow linear. However, due to the tree structure of the tournament evaluation used, a staircase effect may be appreciated in FIG. 11C.

Finally, FIG. 11D shows the speedup achieved using the active iGA with respect to a simple iGA. The results show how, with the active use of a simple low-cost, high-error synthetic fitness function, we were able to achieve speedups ranging from 3 up to 7 times. The instability of the speedup is the result of the constraints on the population sizing (see FIG. 11A). However, being able to cut down the total number of evaluations on such ratios is shown to be an effective method for combating user fatigue.

A significant element for the successful application of interactive evolutionary computation methods, is the reliability of the solution quality assessments made by the user. The decisions that the user takes when using an iGA guide the search across the space of possible hypotheses. Any interactive procedure, regardless of how efficient it is, will perish in the quest for high-quality solutions if the user is unable to provide consistent evaluations. It is helpful to quantify the consistency of users using iGAs, as it is the first step toward ultimately establishing confidence measures on the results obtained by a given user and actively intervene in the interactive evolutionary process, helping the user to achieve high-quality solutions.

An important byproduct of the synthetic fitness described above appears due to using a partial ordering graph ensemble G=<V, E >. Again, a vertex in V represents the solutions $s_i$, presented to the user so far, whereas the edges in E represent the partial-ordering evaluations provided by the user. The minimal scenario for collecting meaningful domain-independent information is provided by a binary tournament scheme (s=2), where given two solutions $\{s_1, s_2\}$ ϵ V the user is able to provide three possible outcomes: 1) $s_1>s_2$; 2) $s_1<S_2$; and 3) $s_1=s_2$ or equal/don't know/don't care. Such a graph G can be transformed—under certain assumptions—into a normalized graph G' containing only bigger than relations. New vertexes and edges are incrementally added after each evaluation provided by the user.

The normalized graph G' presents an important property: cycles represent a clear contradiction on a proper partial ordering. In other words, a cycle in G' formed by three solutions $\{s_1, s_2, s_3, S_1\}$ ϵ $V_n$ is an indication of an inconsistency on the user evaluation criteria because it requires that $s_1>s_2>s_3>S_1$. This simple property allows one to erect a first quantitative measure of the consistency of the evaluations provided by the user. This consistency measure can be defined and used along the run of an exemplary active iGA.

According to additional embodiments of the invention, the partial ordering graph G, which is incrementally built into steps 2, 3, 4, and 9 of the exemplary active iGA described above is used for providing a consistency measure. The basics of the ensemble of G will now be described.

The synthetic fitness used in the exemplary active iGA described above assumes that the interaction of the user with the evolutionary process can be archived for mining and learning purposes. However, it also assumes that this information is going to be limited and independent of the background knowledge available at the problem at hand to be explored. Given the scenario for collecting information mentioned above, the evaluations provided by the user introduce a partial order among the solutions presented so far.

The tournament ordering presented in FIG. 6 guarantees that the partial order introduced by the user evaluations produces a connected graph G=<V, E >, which given certain assumptions, can be easily turned into a normalized directed graph G' as FIG. 7B shows. A table of estimated fitness, and final global estimated ranking is shown in FIG. 12. The directed graph is obtained by replacing the equal (undirected edges) by the proper greater-than or lesser-than relations (directed edges), as shown in the following algorithm. The steps in this exemplary procedure to normalize G into G' to expand equal relationships are:

Procedure normalizeGraph(G=<V, E >)
1) Create the set of draws D={∀e<$v_1,v_2$>ϵE:∃e<$v_2,v_1$>ϵE⇒e<$v_1,v_2$>⊂D}
2) Create the empty set $E_n$ of new edges
3) Copy the arriving paths to the first items at the second items:
$E_n \leftarrow E_n \cup E_1 = \{\forall e<v_1,v_2>\epsilon D: \forall v^i | \exists e<v^i, v_1>\epsilon E \Rightarrow e<v^i,v_2> \subset E_1\}$
4) Copy the arriving paths to the second items at the first items:
$E_n \leftarrow E_n \cup E_1 = \{\forall e<v_1,v_1>\epsilon D: \forall v^i | \exists e<v^i, v_2>\epsilon E \Rightarrow e<v^i,v_1> \subset E_1\}$
5) Copy the departing paths of the first items at the second items:
$E_n \leftarrow E_n \cup E_1 = \{\forall e<v_1,v_2>\epsilon D: \forall v^i | \exists e<v,v^i>\epsilon E \Rightarrow e<v_2,v^i> \subset E_1\}$
6) Copy the departing paths of the second items at the first items:
$E_n \leftarrow E_n \cup E_1 = \{\forall e<v_1,v_2>\epsilon D: \forall v^i | \exists e<v_2,v^i>\epsilon E \Rightarrow e<v_1,v^i> \subset E_1\}$
7) G'=<V', E' >←<V,0 >
8) E'←E∪$E_N$
9) E'←E'−D−$D_N$={∀e<$v_1,v_2$>ϵD:e<$v_2,v_1$>⊂$D_N$}
10) normalizeGraph←G'

Since this partial order graph is a directed graph, such mapping has an interesting property. Given a normalized partial-ordering graph G', if a vertex v appears more than once in a path of δ(v) or ϕ(v), then a cycle in such graph exists. Thus, due to the greater and lesser relations, a contradiction on the user evaluations is identified. This property is the basis of a consistency metric of user evaluations in exemplary methods of the present invention. A user will be consistent at time t if no cycles can be found in the normalized partial-ordering graph G'.

To compute such a measure in an exemplary method, two components are used: 1) cycle detection capabilities for a given graph G at time t ($G^t$); and 2) a heuristic measure to quantify how much inconsistency the detected cycle is introducing. Following these criteria, exemplary algorithms are provided herein to perform the detection of cycles in the graph based on the evaluations made by the user.

A general idea of exemplary algorithms is to maintain the same criteria on identifying the cycles and, thus, avoiding the redundancy on the detected cyclic parts. For each vertex v in G'=<V', E'>, the algorithms explore the relation with the other vertex $V^N$ not yet processed using an accumulative set of visited vertex in the path. Once a set of cyclic paths $C_1$ is formed, the non-cyclic parts of the paths are filtered to avoid the subcycle ambiguity. Then, the algorithm sorts each vertex of a cycle by age. The exemplary algorithm removes the oldest edge that breaks the cycle. Finally, all the vertices that appear in at least one cycle form the set $\chi(G')$, which is used to define the user consistency measure, as explained below.

The exemplary cycle detection algorithm includes the following:
Procedure cycleDetection(G', i)
1) Create the empty sets C of cycles, $V_T$ of visited vertex
2) Extract the first vertex $v^i \in V | v^i \notin V_T$
3) Create the set $V^N = \{\forall v \in V^N:(v \neq v^i) \cap (v \in G')\}$
4) Create the set $C_1 = \{\forall v \in V^N \forall e(v^i,v) \in E : \text{cycleExplorer}(\{v^i\}, v, G') \subseteq C_1\}$
5) Filter the non-cyclic parts of paths $\forall c \in C_1$
6) Sort cycles considering the oldest vertex as the first/last vertex $\forall c \in C_1$
7) $V_T \leftarrow V_T \cup \{v^i\}$
8) $C \leftarrow C \cup C_1$
9) Go to 2) while $\forall v^i \in G' : v^i \notin V_T$ Else cycleDetection$\leftarrow$C An exemplary algorithm cycleExplorer to explore all paths departing from v in VI includes the following steps:
Procedure cycleExplorer($V_1$, v, G'=<V', E'>)
1) $V_1 \Leftarrow V_1 \cup v$
2) Create the set $R = \{\forall v^i \in V_1 \forall e(v,v^i) \in E' : e(v,v^i) \subseteq R\}$
3) $(R \neq 0) \Rightarrow \text{return}(R)$
4) Create the set $C_1 = \{\forall v^i \in (V - \{v\}) \forall e(v,v^i) \in E' : \text{cycleExplorer}(V_1,v^i,G') \subseteq C_1\}$
5) return($C_1$)

Using the algorithms and definitions provided above, we are now able to introduce a measure of the user consistency. The consistency of a user at time t, $\kappa(G'^t, \omega)$ is defined as follows:

$$\kappa(G'^t, \omega) = 1 - \left(\frac{1}{|V'^t|} \cdot \sum_{v \in \chi(G'^t)} \omega_v\right)^\alpha$$

where $|V'^t|$ is the number of vertices in G' at time t, $\omega_v$ the weight of vertex v, $\chi(G'^t)$ the vertexes in the cycles detected in G' at time t, and $\alpha$ a global scaling factor greater than or equal to 1. In an exemplary embodiment, unless noted otherwise, $\omega_v$ is equal to 1 for any $v \in V^t$ and $\alpha=1$. This may not be true, for example, if one wants to emphasize one or more properties.

The measure is a snapshot of the user consistency at time t. For the rest of the calculations in exemplary embodiments, we assume $t=t_\omega$—or final time. Measuring user consistency accurately would require an average integration of the consistency along the interactive run. FIGS. 13-16 illustrate how the $\kappa$ measure behaves. These figures present the partial-ordering graph, the synthetic fitness and ordering computed, and consistency of the user $\kappa(G'^t,\omega)$ at iterations 1-4, respectively. This example illustrates how the wrong decision provided by the user may greatly reduce the consistency.

An active iGA according to exemplary embodiments of the present invention is described herein, including an exemplary consistency measure. The exemplary active iGA is applied to training a Text-to-Speech (TTS) program. The aim of any TTS system is the generation of synthetic speech from text. The performance of such systems is evaluated by human beings based on the perceived speech quality. Hence, it is essential to embed this subjective criterion into the tuning process of the TTS system for achieving highly natural synthetic speech. The corpus-based or unit selection TTS approach is one of the state-of-the-art techniques that try to reach this aim. This method generates the synthetic speech signal using the selection and concatenation of recorded speech units. The tuning of the unit selection module is one of the most important processes in getting high quality synthetic speech. The selection process is driven by a cost function, which is typically computed as the combination of several weighted subcosts. A key issue involves the accurate tuning of these weights; that is, mapping the user subjective preferences among candidate units, which is a complicated task. Several approaches have been proposed for weight training, distinguishing between either hand-tuning or machine-driven—purely objective methods or perceptually optimized techniques.

GAs have been used for tackling the weight tuning problem. This technique has overcome restrictions of classic approaches, attaining better results with a feasible computational effort. Nevertheless, this approach, as with other known techniques, needs to face a key challenge: the reliable estimation of the subjective perception of the speech attributes; i.e., it is very difficult to define a solid perception mapping function. Thus, it is helpful to actually incorporate user preferences for accurately tuning the weights of the cost function. As a first step, a simple iGA has been applied for weight tuning, allowing an actual perception guided adjustment. However, problems have arisen, such as the tediousness of the process (user fatigue) and the complexity of maintaining a stable comparison criterion throughout the whole process (user consistency), which are weaknesses related to iGAs.

The exemplary active iGA disclosed above provides several advantages for combating user fatigue, showing that learning from user interaction and exploiting the learned knowledge to guide the process of collecting user evaluations can greatly reduce the number of evaluations required to achieve high-quality solutions. Moreover, the user consistency can be evaluated according to the number of cycles of the partial-ordering graph. Thus, the exemplary iGAs allow one to face the main drawbacks of the iGA-based weight tuning approach, while incorporating the perception of the user to the process. Due to the real-valued representation of the weight tuning problem, the optimization step is conducted by a continuous PBIL (e.g, as described in Sebag, M. & Ducoulombier, A., "Extending population-based incremental learning to continuous search spaces," Lecture Notes in Computer Science, 1498, 1998, pp. 418-427) instead of using cGA.

The main goal of the experiments is to explore the consistency of user evaluations for interactive corpus-based TTS weight tuning. We have repeated the experimentation done in Alías, F., Llorà, X., Iriondo, I., Sevillano, X., Formiga, L., & Socoró, J. C., "Perception-Guided and Phonetic Clustering Weight Tuning Based on Diphone Pairs for Unit Selection TTS," Proceedings of the 8$^{th}$ International Conference on Spoken Language Processing (ICSLP), Jeju Island, Korea, 2004, pp. 1333-1336, which is incorporated by reference herein, but replacing the simple iGA with the exemplary active iGA shown in FIG. 9. The consistency of user evaluations when using both interactive methods is computed by $\kappa(G, \omega)$. Measuring the user consistency required us to set up controlled experiments. For such purposes, we used the Sin-Evo platform to provide the interface to collect user evaluations.

Given the measure of user consistency $\kappa(G'^t, \omega)$, we analyzed the consistency of the users along the evolutionary process from the Alias et al. experimentation. The upper portion of the table in FIG. 17 presents the consistency of the users involved in the experiments at the end of evolutionary process. The collected logs of the tournaments presented to the users allowed us to do so. We also studied how $\kappa(G'^t, \omega)$ changed at each tournament t presented to the user. These results are displayed on the left portion of FIGS. 18-21. Each of these figures stands for one of the four Catalan phrases explored: "De la seva selva", "Fusta de Birmània", "I els han venut", and "Grans extensions".

Two main realizations occurred when analyzing the logs using the $\kappa(G'^t, \omega)$ consistency measure. As shown in FIG. 17, only the expert user was consistent all the time in a particular experiment. Regardless of the user profile—novice, knowledgeable, or expert—all the users had troubles maintaining a consistent criteria during a session using a simple iGA. Another relevant discovery was that inconsistencies show early on the run of the iGA. On average, regardless of their profile, users tend to contradict themselves around tournament 14, and they contradict themselves 2.83 times per run. Such inconsistencies may be regarded as a noisy subjective fitness function and, hence, be responsible for increasing the number of evaluations required from the user to get a high-quality solution—relieving user fatigue.

The analysis was repeated replacing the simple iGA in Sin-Evo by an active iGA. The lower portion of FIG. 17 presents the consistency $\kappa(G'^{t_\omega}, \omega)$ of the users involved in the experiments at the end of the evolutionary process conducted using an active iGA. We also studied again how $\kappa(G'^t, \omega)$ changed at each tournament t presented to the user. These results are displayed on the right portion of FIGS. 18-21. We repeated the same experimental setup using the same four Catalan phrases.

The first impression after the analysis of the results obtained using active iGAs is the boost in the consistency of the evaluations provided by the user. Using active iGAs, only two out of the fifteen experiments ended in an inconsistent status, that is, where $\kappa(G'^{t_\omega}, \omega)<1$. Nevertheless, the consistency of these runs was above the average consistency achieved using a simple iGA, which only helped the user to stay consistent in one of the fifteen experiments. Another interesting insight at the consistency support provided by the use of active iGAs, as shown in FIGS. 18-21, is that even if the user provides a contradictory evaluation, the active selection of tournaments based on the partial-ordering graph G helps the user to get back on the track of consistency.

Given these results, we could compute the enhancement on the consistency introduced by using active iGAs for the weight tuning of the TTS embedded in Sin-Evo. The table in FIG. 22 presents the consistency enhancement percentage between using a simple iGA and an active iGA. Significantly, by using the exemplary active iGA, we were able to boost the consistency along the evolutionary process, supporting the user to provide consistent and unambiguous evaluations.

One of the main reasons for the introduction of active iGAs was to cut drastically the number of evaluations required from the user, in a successful effort to combat user fatigue. Though no special efforts were made to tune the active iGA model for efficiency enhancement, as the table at FIG. 23 also shows, an automatic reduction on the number of required user evaluations also was collected. On average, the usage of an active iGA according to embodiments of the present invention reduced by half the number of evaluations required from the user and, hence, required the user to spend half of the time that was spent on the original TTS weight-tuning experiment. The stopping criteria were set due to the increment of draws and cycles in the graph—this usually happened around generation 3.

A measure of the solution-quality assessments provided by a user in an iGA session has been introduced according to embodiments of the present invention. A partial-ordering graph can be used to measuring and/or address user consistency via cycle detection. In a partial-ordering graph, a cycle is a clear indication of user solution-quality assessment inconsistency. A consistency measure $\kappa$ is provided, which requires 1) cycle detection capabilities given a partial-ordering graph, and 2) a heuristic to quantify how much inconsistency the detected cycles are introducing.

In an exemplary active iGA described above, a theoretical framework is assumed where the decision variables involved on the interactive process were independent. This simplifies the theoretical analysis. As a result of the theoretical framework adopted, some exemplary embodiments of the present invention described above use an $\epsilon$-SVM with a linear kernel as the model for the synthetic fitness and the cGA to optimize the learned synthetic fitness. However, such an assumption does not constrain the ability of the active iGA to achieve linkage learning capabilities, provided proper learning and optimization algorithms are chosen. Methods of the present invention, as explained above, are not limited to use of $\epsilon$-SVM and cGA.

It will be appreciated that methods and systems of the present invention are applicable to optimization methods in addition to those described above with respect to genetic and evolutionary computing. Examples of optimization methods that may be improved using methods and systems of the present invention include, but are not limited to, evolutionary computing, operations research (OR), global optimization methods, meta-heuristics, artificial intelligence and machine learning techniques, etc. The present invention is not intended to be limited to genetic and evolutionary computing.

Embodiments of the present invention are directed to methods and program products for interactive computing. Those knowledgeable in the art will appreciate that embodiments of the present invention lend themselves well to practice in the form of computer program products. Accordingly, it will be appreciated that embodiments of the invention may comprise computer program products comprising computer executable instructions stored on a computer readable medium that when executed cause a computer to undertake certain steps. Other embodiments of the invention include systems for interactive computing, with an example being a processor-based system capable of executing instructions that cause it to carry out a method of the invention. It will accordingly be appreciated that description made herein of a method of the invention may likewise apply to a program product of the invention and/or to a system of the invention.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method for optimizing a solution to a problem in a hardware computer, the method comprising:
   a) creating at least one solution;
   b) presenting said at least one solution to a user in an interactive computer session;
   c) receiving input from the user in the interactive computer session, said received input representing subjective fitness of the at least one solution for the problem;
   d) providing a partial ordering of a plurality of solutions in the computer based on said received input, wherein a partial ordering is a partial ordering graph G<V, E>, where vertices in V represent solutions presented to the user so far, and edges in E represent received input from the user representing a pair-wise comparison between solutions;
   e) inducing a complete order of at least the plurality of solutions presented to the user in the computer based on said provided partial ordering;
   f) generating a synthetic surrogate subjective fitness function in the computer using said induced complete order, wherein said generating further comprises using the number of dominated vertices and the number of dominating vertices in V;
   g) creating at least one new solution to the problem using said generated synthetic surrogate subjective fitness.

2. The method of claim 1, further comprising:
   h) presenting said at least one new solution to the user during the interactive computer session;
   repeating c)-h) until stopping criteria are met.

3. The method of claim 1, wherein said creating at least one new solution comprises generating a first group of solutions using said generated synthetic subjective surrogate fitness, generating a second group of solutions using said created plurality of solutions, and combining the generated first group and the generated second group.

4. The method of claim 1, wherein said generating a synthetic subjective surrogate fitness comprises:
   training a surrogate function using said induced complete order.

5. The method of claim 4, wherein said training is further based on determined fitness values for the larger plurality of solutions.

6. The method of claim 1, further comprising:
   optimizing said synthetic surrogate subjective fitness function.

7. The method of claim 6, wherein said optimized synthetic surrogate subjective fitness function comprises an estimation of distribution algorithm (EDA).

8. The method of claim 7, wherein said creating at least one new solution comprises sampling from the EDA.

9. The method of claim 1, wherein said creating comprises creating a plurality of solutions in the computer, wherein said presenting comprises presenting said created plurality of solutions to the user in groups of two, and wherein said receiving input from the user comprises receiving an input during the interactive computer session representing:
   a) the first of the group of two has greater fitness than the second of the group of two;
   b) the second of the group of two has greater fitness than the first of the group of two; OR
   c) neither a) nor b).

10. The method of claim 1, further comprising:
    providing a normalized directed partial ordering in the computer based on said provided partial ordering graph, wherein all edges E in the directed partial ordering graph comprise one of a greater-than relation and a lesser-than relation.

11. The method of claim 10, further comprising:
    based on said normalized directed partial ordering, determining that an inconsistency in user decisions is present if at least one vertex is both dominated by a second vertex and dominates the second vertex.

12. The method of claim 11, further comprising:
    correcting said determined inconsistency.

13. The method of claim 12, wherein said correcting comprises:
    removing at least one edge E from the directed partial ordering.

14. The method of claim 13, wherein said removing is based on at least one of recency, statistical methods, input from the user, and input from an outside source.

15. The method of claim 1, wherein said inducing a complete order comprises:
    for each vertex v in V, determining a number of other vertices $\delta(v)$ that are dominated by v, and determining a number of other vertices $\phi(v)$ that dominate vertex v;
    determining a synthetic subjective fitness for each vertex v using $\delta(v)$ and $\phi(v)$;
    ranking each vertex v using said determined synthetic subjective fitness.

16. A computer program product for optimizing a solution set, the computer program product comprising computer readable instructions stored on a computer readable memory or medium that when executed by one or more computers cause the one or more computers to perform the steps in the method of claim 1.

17. A method for determining decision consistency for a user in an interactive computer session performed using a hardware computer, the interactive computer session including a plurality of user decisions representing subjective assessment of a plurality of solutions to a problem, the method comprising:
    receiving user decisions representing fitness for the plurality of solutions during the interactive computer session;
    providing a partial ordering of the plurality of solutions in the computer based on said received user decisions, wherein at least some of the plurality of solutions are represented to have a greater relative fitness than other of the plurality of solutions, and providing a partial ordering graph G<V, E>in the computer, where a vertex in V represents solutions presented to the user so far, and an edge in E represents received input from the user representing a pair-wise comparison between solutions;
    normalizing said partial ordering in the computer;
    based on said normalized partial ordering, computing an inconsistency measure in the computer based on whether at least a first solution in said normalized partial ordering is represented to have a greater relative fitness than a second solution and whether the second solution is represented to have a greater relative fitness than the first solution, wherein computing the inconsistency further comprises forming a set of cyclic paths, sorting each vertex of a cycle by age, and removing the oldest edge that breaks each cycle.

18. The method of claim 17, wherein said normalizing comprises setting every edge E in graph G to one of a greater-than relation and a lesser than relation based on said partial ordering.

19. The method of claim 17, further comprising:
based on said partial ordering, for each vertex v in V, determining vertices that are dominated by v, and determining vertices that dominate vertex v;
wherein an inconsistency exists if at least one vertex v is both dominated by a second vertex and dominates the second vertex.

20. The method of claim 17, further comprising:
removing the inconsistency in the computer by removing one or more edges E.

21. The method of claim 20, wherein said removing is based on at least one of recency, statistical methods, input from the user, and input from an outside source.

22. A computer program product for optimizing a solution set, the computer program product comprising computer readable instructions stored on a computer readable memory or medium that when executed by one or more computers cause the one or more computers to perform the steps in the method of claim 17.

23. A method for creating a synthetic surrogate fitness function in a hardware computer, the synthetic surrogate fitness function computing a fitness of one or more solutions to a problem, the method comprising:
receiving user decisions in the computer representing fitness for a plurality of solutions;
providing a partial ordering of the plurality of solutions in the computer based on said received user decisions, wherein at least some of the plurality of solutions are represented to have a greater relative fitness for the problem than other of the plurality of solutions, wherein a partial ordering is a partial ordering graph G<V, E>, where vertices in V represent solutions presented to the user so far, and edges in E represent received input from the user representing a pair-wise comparison between solutions;
normalizing said partial ordering in the computer;
inducing a complete order of at least the plurality of solutions in the computer based on said normalized partial ordering;
generating the synthetic surrogate fitness function in the computer using said induced complete order, wherein said generating further comprises using the number of dominated vertices and the number of dominating vertices in V.

24. The method of claim 23, wherein said generating is further based on fitness values determined from said received user decisions.

25. The method of claim 23, wherein said normalizing comprises adjusting said partial ordering such that all edges E in said normalized partial ordering graph comprise one of a greater-than relation and a lesser-than relation.

26. The method of claim 25, said inducing a complete order comprises:
for each vertex v in V, determining a number of other vertices δ(v) that are dominated by v, and determining a number of other vertices φ(v) that dominate vertex v;
determining a synthetic subjective fitness for each vertex v using δ(v) and φ(v);
ranking each vertex v using said determined synthetic subjective fitness.

27. The method of claim 23, further comprising:
based on said normalizing, determining that an inconsistency in user decisions is present if at least one vertex is both dominated by a second vertex and dominates the second vertex.

28. The method of claim 27, further comprising:
correcting said determined inconsistency.

29. The method of claim 23, further comprising:
generating at least one new solution using said generated synthetic surrogate fitness function;
presenting said generated at least one new solution to the user in an interactive computer session.

30. The method of claim 29, wherein said presented at least one new solution is combined with at least one previously presented solution in the computer before said presenting.

31. A computer program product for optimizing a solution set, the computer program product comprising computer readable instructions stored on a computer readable memory or medium that when executed by one or more computers cause the one or more computers to perform the steps in the method of claim 23.

32. A method for optimizing a solution to a problem during an interactive computer session with a user, the method comprising:
a) presenting to a user via a hardware computer a plurality of choices representing a plurality of solutions to the problem;
b) receiving by the user via the hardware computer decision data representing preferences among said plurality of choices by the user relative to the problem;
c) generating a model in the computer representing fitness using said received decision data, and providing a partial ordering based on said received decision data, wherein a partial ordering is a partial ordering graph G<V, E>, where vertices in V represent solutions presented to the user so far, and edges in E represent received input from the user representing a pair-wise comparison between choices;
d) generating new solutions in the computer using said generated model, wherein said generating comprises inducing a complete ordering on said partial ordering, wherein said model comprises translating said partial ordering into a numeric fitness value using the number of dominated vertices and the number of dominating vertices in V;
e) presenting at least one or more of said generated new solutions to the user in the interactive computer session as a new plurality of choices;
f) repeating steps b)-e) over at least one additional iteration.

33. A computer program product for optimizing a solution set, the computer program product comprising computer readable instructions stored on a computer readable memory or medium that when executed by one or more computers cause the one or more computers to perform the steps in the method of claim 32.

* * * * *

UNITED STATES PATENT AND TRADEMARK OFFICE
CERTIFICATE OF CORRECTION

PATENT NO.      : 7,979,365 B2
APPLICATION NO. : 11/700989
DATED           : July 12, 2011
INVENTOR(S)     : Goldberg et al.

It is certified that error appears in the above-identified patent and that said Letters Patent is hereby corrected as shown below:

In the Specification:

| | |
|---|---|
| Col. 3, line 13-14 | Please delete "epsilon-SVM" and insert --$\varepsilon$-SVM-- therefor. |
| Col. 3, line 16 | Please delete "epsilon-SVM" and insert --$\varepsilon$-SVM-- therefor. |
| Col. 3, line 45 | Please delete "Birmänia" and insert --Birmania-- therefor. |
| Col. 8, line 17 | Please delete "$\epsilon$-insensitive" and insert --$\varepsilon$-insensitive-- therefor. |
| Col. 8, line 18 | Please delete "($\epsilon$-SVM)" and insert --($\varepsilon$-SVM)-- therefor. |
| Col. 8, line 18 | Before "may be", please delete "$\epsilon$-SVM" and insert --$\varepsilon$-SVM-- therefor. |
| Col. 8, line 24 | Please delete "$\epsilon$-SVM" and insert --$\varepsilon$-SVM-- therefor. |
| Col. 8, line 33 | Please delete "$\epsilon$-SVM" and insert --$\varepsilon$-SVM-- therefor. |
| Col. 8, line 34 | Please delete "$\epsilon$-SVM" and insert --$\varepsilon$-SVM-- therefor. |
| Col. 8, line 46 | Please delete "$\epsilon$-SVM" and insert --$\varepsilon$-SVM-- therefor. |
| Col. 8, line 50 | Please delete "$\epsilon$-SVM" and insert --$\varepsilon$-SVM-- therefor. |
| Col. 8, line 51 | Please delete "$\epsilon$-SVM" and insert --$\varepsilon$-SVM-- therefor. |
| Col. 8, line 54 | After "size", please delete "1" and insert --$\ell$-- therefor. |
| Col. 8, line 56 | Please delete "1+2" and insert --$\ell$+2-- therefor. |
| Col. 8, line 58 | Please delete "$\epsilon$-SVM" and insert --$\varepsilon$-SVM-- therefor. |
| Col. 9, line 3 | Please delete "$\epsilon$-SVM" and insert --$\varepsilon$-SVM-- therefor. |
| Col. 9, line 25 | Please delete "$\epsilon$-SVM" and insert --$\varepsilon$-SVM-- therefor. |
| Col. 9, line 31 | Please delete "$\epsilon$-SVM" and insert --$\varepsilon$-SVM-- therefor. |
| Col. 11, line 29 | Please delete "$\epsilon$-SVM" and insert --$\varepsilon$-SVM-- therefor. |
| Col. 11, line 57 | Please delete "$\epsilon$-SVM" and insert --$\varepsilon$-SVM-- therefor. |
| Col. 12, line 17 | Please delete "$\epsilon$-SVM" and insert --$\varepsilon$-SVM-- therefor. |
| Col. 12, line 19 | Please delete "$\epsilon$-SVM" and insert --$\varepsilon$-SVM-- therefor. |

Signed and Sealed this
Third Day of April, 2012

David J. Kappos
*Director of the United States Patent and Trademark Office*

CERTIFICATE OF CORRECTION (continued)

| | |
|---|---|
| Col. 12, line 29 | Please delete "$\epsilon$-SVM" and insert --$\varepsilon$-SVM-- therefor. |
| Col. 13, line 46 | After "sizes", please delete "1" and insert --$\ell$-- therefor. |
| Col. 14, line 30 | Please delete "Back" and insert --Bäck-- therefor. |
| Col. 15, line 15 | Please delete "$\epsilon$-SVM" and insert --$\varepsilon$-SVM-- therefor. |
| Col. 15, line 16 | Before "in the", please delete "1" and insert --$\ell$-- therefor. |
| Col. 15, line 19 | After "problem size", please delete "1" and insert --$\ell$-- therefor. |
| Col. 16, lines 47-48 | Please delete $$\text{“}E_n \leftarrow E_n \cup E_1 = \{\forall e<v_1,v_1>\epsilon D: \forall v^i | \exists e<v^i,v_2>\epsilon E \Rightarrow e<v^i,v_1> \subseteq E_1\}\text{”}$$ and insert $$-- E_n \leftarrow E_n \cup E_l = \{\forall e<v_1,v_2>\in D: \forall v^i | \exists e<v^i,v_2>\in E \Rightarrow e<v^i,v_1>\subseteq E_l\} --$$ therefor. |
| Col. 16, lines 51-52 | Please delete $$\text{“}E_n \leftarrow E_n \cup E_1 = \{\forall e<v_1,v_2>\epsilon D: \forall v^i | \exists e<v,v^i>\epsilon E \Rightarrow e<v_2,v^i> \subseteq E_1\}\text{”}$$ and insert $$-- E_n \leftarrow E_n \cup E_l = \{\forall e<v_1,v_2>\in D: \forall v^i | \exists e<v_1,v^i>\in E \Rightarrow e<v_2,v^i>\subseteq E_l\} --$$ therefor. |
| Col. 16, lines 55-56 | Please delete $$\text{“}E_n \leftarrow E_n \cup E_1 = \{\forall e<v_1,v_2>\epsilon D: \forall v^i | \exists e<v,v^i>\epsilon E \Rightarrow e<v_2,v^i> \subseteq E_1\}\text{,}$$ and insert $$-- E_n \leftarrow E_n \cup E_l = \{\forall e<v_1,v_2>\in D: \forall v^i | \exists e<v_2,v^i>\in E \Rightarrow e<v_1,v^i>\subseteq E_l\} --$$ therefor. |
| Col. 17, line 16 | Please delete "$C_1$" and insert --$C_l$-- therefor. |

CERTIFICATE OF CORRECTION (continued)
U.S. Pat. No. 7,979,365 B2

Col. 17, lines 29-30  Please delete

"$C_1 = \{\forall v \in V^N \forall e(v^i, v) \in E : cycleExplorer(\{v^i\}, v, G') \subseteq C_1\}$"

and insert

--$C_l = \{\forall v \in V^N \forall e(v^i, v) \in E : cycleExplorer(\{v^i\}, v, G') \subseteq C_l\}$-- therefor.

Col. 17, line 31  Please delete "$\forall c \in C_1$" and insert --$\forall c \in C_l$-- therefor.

Col. 17, line 34  Please delete "$\forall c \in C_1$" and insert --$\forall c \in C_l$-- therefor.

Col. 17, line 36  Please delete "$C \leftarrow C \cup C_1$" and insert --$C \leftarrow C \cup C_l$-- therefor.

Col. 17, line 38  Please delete "Vl" and insert --$V_l$-- therefor.

Col. 17, line 39  Please delete "cycleExplorer(V$_1$, v, G'=<V', E'>)" and insert --$cycleExplorer(V_l, v, G' = <V'E'>)$-- therefor.

Col. 17, line 40  Please delete "V$_1$ ⇐ V$_1$∪v" and insert --$V_l \Leftarrow V_l \cup v$-- therefor.

Col. 17, line 41  Please delete "$R = \{\forall v^i \in V_1 \forall e(v, v^i) \in E' : e(v, v^i) \subseteq R\}$" and insert --$R = \{\forall v' \in V_l \forall e(v, v') \in E' : e(v, v') \subseteq R\}$-- therefor.

Col. 17, line 43-44  Please delete

"$C_1 = \{\forall v' \in (V - \{v\}) \forall e(v, v') \in E' : cycleExplorer(V_1, v', G') \subseteq C_1\}$,"

and insert

--$C_l = \{\forall v' \in (V - \{v\}) \forall e(v, v') \in E' : cycleExplorer(V_l, v', G') \subseteq C_l\}$-- therefor.

Col. 17, line 45  Please delete "return (C$_1$)" and insert --$return(C_l)$-- therefor Col. 17, line 64  Please delete "t=t$_\omega$—" and insert --$t = t_\omega$-- therefor.

Col. 19, line 13  Please delete "Alias et al." and insert --Alías et al.-- therefor.

Col. 19, line 51  Please delete "$\kappa(G^{r_\omega}, \omega) < 1$" and insert --$\kappa(G^{r_\omega}, \omega) < 1$-- therefor.

Col. 20, line 30  Please delete "$\epsilon$-SVM" and insert --$\varepsilon$-SVM-- therefor.

Col. 20, line 37  Please delete "$\epsilon$-SVM" and insert --$\varepsilon$-SVM-- therefor.